US011934127B2

(12) United States Patent
Ubagai

(10) Patent No.: US 11,934,127 B2

(45) Date of Patent: Mar. 19, 2024

(54) FIXATION DEVICE HAVING BELT WITH SPECIFIC HARDNESS RATIO AND IMAGE FORMATION APPARATUS

(71) Applicant: Oki Electric Industry Co., Ltd., Tokyo (JP)

(72) Inventor: Akira Ubagai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/156,170

(22) Filed: Jan. 18, 2023

(65) Prior Publication Data

US 2023/0305465 A1 Sep. 28, 2023

(30) Foreign Application Priority Data

Mar. 28, 2022 (JP) ................................ 2022-052311

(51) Int. Cl.
*G03G 15/20* (2006.01)

(52) U.S. Cl.
CPC ..... *G03G 15/2053* (2013.01); *G03G 15/2057* (2013.01)

(58) Field of Classification Search
CPC ........... G03G 15/2057; G03G 15/2053; G03G 2215/2016; G01N 3/40; G01N 2203/0078
USPC .............................. 399/329; 219/216; 73/81
See application file for complete search history.

(56) References Cited

U.S. PATENT DOCUMENTS

| | | | | |
|---|---|---|---|---|
| 9,857,739 B2 | 1/2018 | Miyahara et al. | | |
| 2011/0236080 A1* | 9/2011 | Kouno | G03G 15/162 | 399/302 |
| 2015/0212461 A1* | 7/2015 | Abe | G03G 15/2057 | 428/447 |
| 2023/0305462 A1* | 9/2023 | Ootaka | G03G 15/2053 | 399/329 |
| 2023/0305464 A1* | 9/2023 | Kanno | G03G 15/2053 | 399/329 |

FOREIGN PATENT DOCUMENTS

| | | |
|---|---|---|
| JP | 2015-148760 A | 8/2015 |
| JP | 2019-144509 A | 8/2019 |

* cited by examiner

*Primary Examiner* — Robert B Beatty
(74) *Attorney, Agent, or Firm* — METROLEX IP LAW GROUP, PLLC

(57) ABSTRACT

A fixation device according to an embodiment may include: an annular belt including an elastic layer with a thickness of more than 300 μm; and a counter member opposed to an outer peripheral surface of the annular belt to form a nip region with the annular belt. A ratio (A/B) of a first hardness value (A) to a second hardness value (B) of the outer peripheral surface of the annular belt is 0.566 or more, where the first hardness value is measured, in hardness measurement using a hardness meter, at a time when a passage time, which is a time it takes for a certain point of the outer peripheral surface to pass through the nip region, has just passed from the start of the hardness measurement, and the second hardness value is measured at a time when the measured value of the hardness meter has just been saturated.

9 Claims, 10 Drawing Sheets

TBL1

| FIXATION BELT | | | 77A | 77B | 77C | 77D | 77E |
|---|---|---|---|---|---|---|---|
| ELASTIC LAYER | THICKNESS (μm) | GREATEST VALUE | 313 | 416 | 607 | 550 | 834 |
| | | SMALLEST VALUE | 288 | 377 | 494 | 469 | 788 |
| | | AVERAGE VALUE | 300 | 393 | 560 | 507 | 810 |
| | HARDNESS (°) | | 30 | 30 | 30 | 40 | 30 |
| SURFACE LAYER | THICKNESS (μm) | | 20 | 20 | 20 | 20 | 20 |
| MEASURED HARDNESS VALUE (AVERAGE VALUE) | LOAD HARDNESS VALUE | | 39.8 | 52.8 | 51.3 | 67.7 | 57.7 |
| | SATURATED HARDNESS VALUE | | 79.8 | 85.2 | 77.6 | 80.9 | 71.5 |
| LOAD HARDNESS RATIO | | GREATEST VALUE | 0.536 | 0.637 | 0.698 | 0.898 | 0.815 |
| | | SMALLEST VALUE | 0.458 | 0.566 | 0.584 | 0.810 | 0.700 |
| | | AVERAGE VALUE | 0.499 | 0.616 | 0.654 | 0.837 | 0.760 |
| GLOSS LEVEL | | | 3 | 5 | 6 | 6 | 10 |
| SURFACE LAYER CRACKING | | | NO | NO | NO | NO | YES |
| OVERALL RATING | | | × | ○ | ○ | △ | △ |

FIG. 10
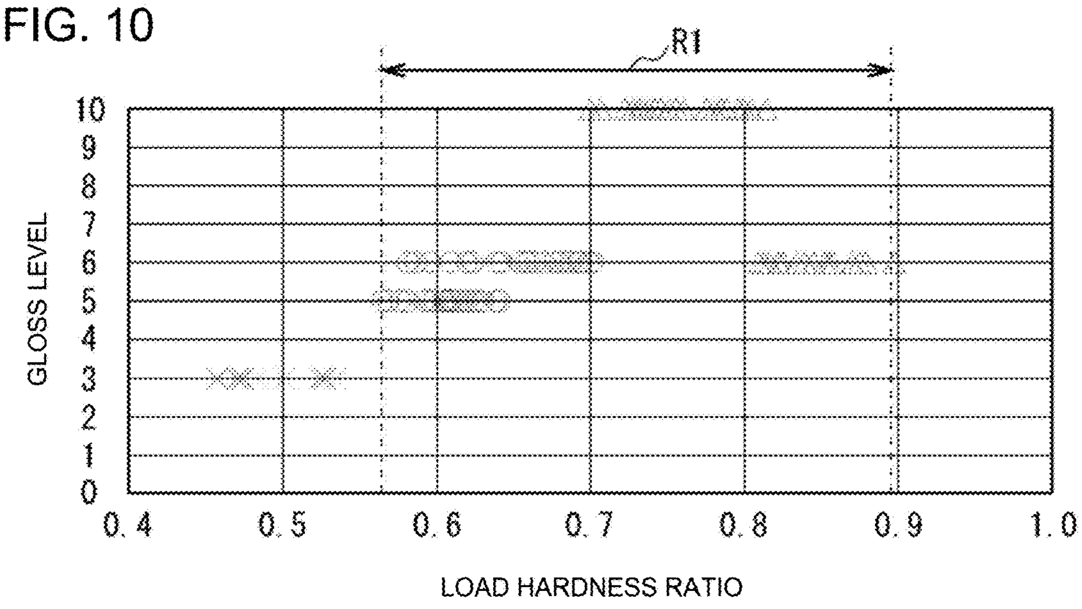
FIG. 11
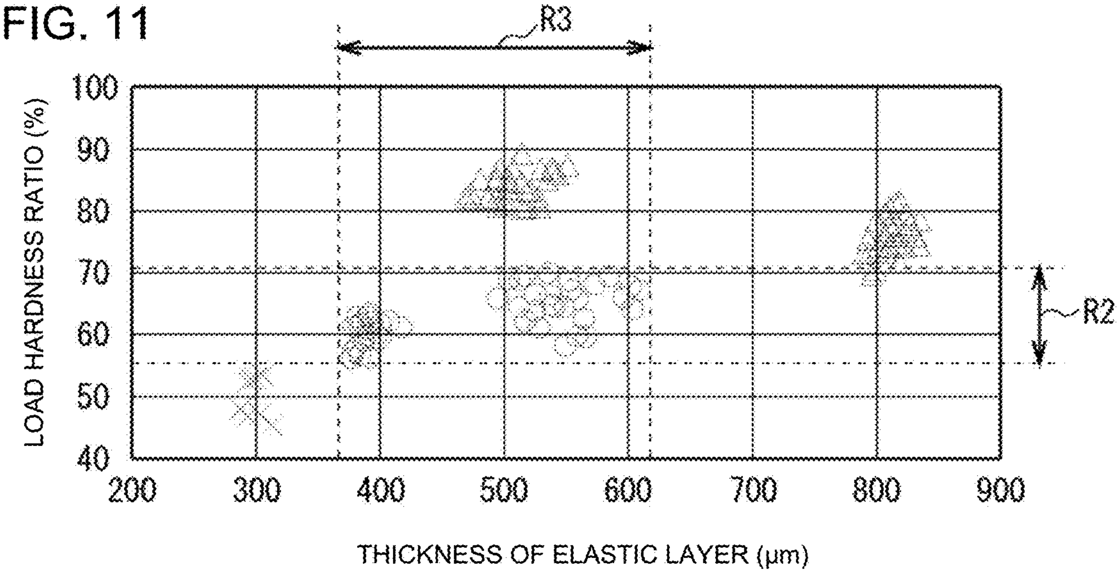
FIG. 12
TBL2
| FIXATION BELT | | 277A | 277B | 277C | 277D | 277E | 277F | 277G |
|---|---|---|---|---|---|---|---|---|
| ELASTIC LAYER | THICKNESS (μm) | 300 | 377 | 393 | 507 | 560 | 607 | 810 |
| GLOSS LEVEL | | 3 | 5 | 5 | 6 | 6 | 6 | 10 |
| OVERALL RATING | | × | ○ | ○ | ○ | ○ | ○ | × |

FIG. 16A
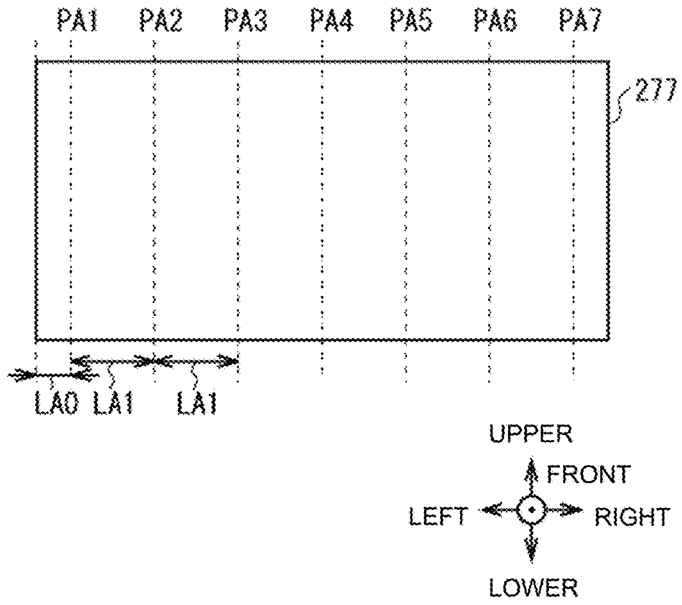
FIG. 16B
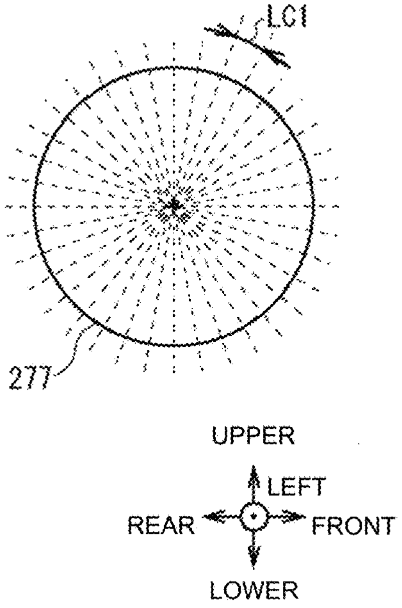
FIG. 17A
FIG. 17B
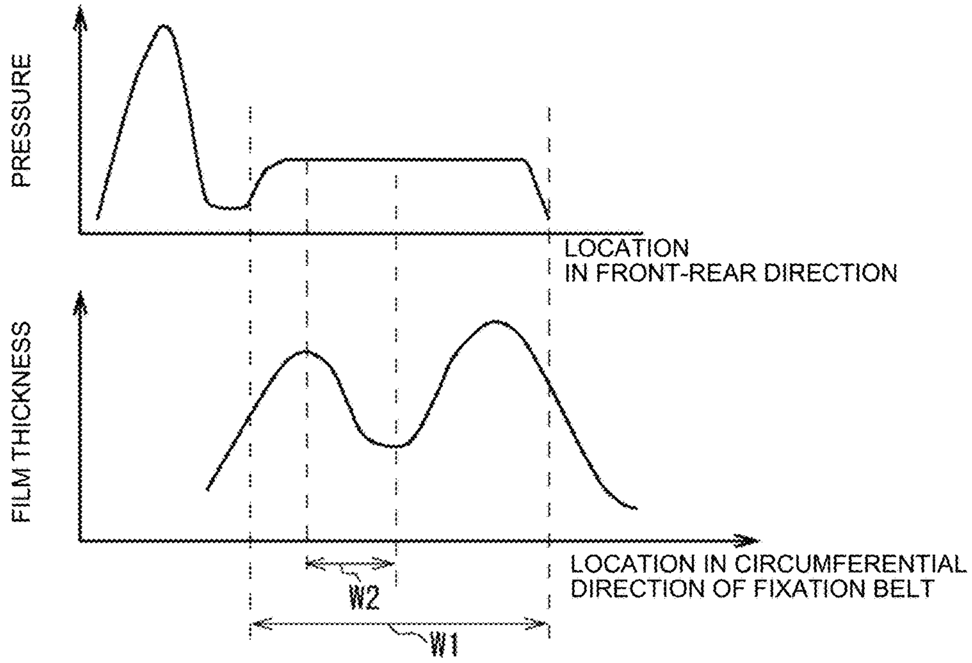

TBL3

| FILM THICKNESS DIFFERENCE T2 IN WIDTH DIRECTION (μm) | 15 | 20 | 31 | 42 | 47 | 53 | 58 | 101 | 135 |
|---|---|---|---|---|---|---|---|---|---|
| IMAGE DROPOUT | ○ | ○ | ○ | ○ | ○ | × | × | × | × |

FIXATION DEVICE HAVING BELT WITH SPECIFIC HARDNESS RATIO AND IMAGE FORMATION APPARATUS

CROSS REFERENCE TO RELATED APPLICATIONS

This application claims priority based on 35 USC 119 from prior Japanese Patent Application No. 2022-052311, filed on Mar. 28, 2022, entitled "FIXATION DEVICE AND IMAGE FORMATION APPARATUS," the entire contents of which are incorporated herein by reference.

BACKGROUND

The disclosure may relate to fixation devices and image formation apparatuses, for example, those that are suitably applied to electrophotographic printers.

In a related art, there has been known an image formation apparatus configured to form a toner image (as a developer image) using toner (as a developer) by a development device, transfer the toner image onto paper (serving as a medium), and fix the toner image transferred on the paper to the paper by a fixation device applying heat and pressure thereto, so as to print an image. The fixation device includes rollers, annular belts, or the like provided on upper and lower sides of a conveyance path for the paper and configured to sandwich the paper in a nip region formed therebetween and apply heat and pressure the paper.

In image formation apparatuses, an image may be printed on paper having a relatively rough surface, such as so-called embossed paper or the like. However, for such paper, toner fixability may be low, particularly at recessed portions of the paper. With this in mind, there has been proposed a technique of improving the fixability by regulating the depth in which the fixation belt is pressed down (see, for example, Patent Document 1).

Patent Document 1: Japanese Patent Application Publication No. JP 2015-148760 (see FIG. 4, etc.)

SUMMARY

A certain medium used in image formation apparatuses may be in the shape of a film having a number of fine pores in order to increase the flexibility thereof, for example, suitable for a package of commercial products.

However, when an image is formed on such a medium, toner is unlikely to be appropriately fixed. As a result, the printed image is locally non-glossy, i.e., has irregular gloss, likely resulting in a decrease in image quality.

An object of an embodiment of the disclosure may be to provide a fixation device and an image formation apparatus that can realize improved quality of an image which is fixed to a medium having minute roughness on a surface thereof.

A first aspect of the disclosure may be a fixation device that may include: an annular belt with an outer peripheral surface that moves at a predetermined speed, the annular belt including an elastic layer with a thickness of more than 300 μm; and a counter member that is opposite the outer peripheral surface of the annular belt, and forms a nip region with the annular belt. A ratio (NB) of a first hardness value (A) to a second hardness value (B) of the annular belt is 0.566 or more, where the first hardness value (A) is a value as measured, in hardness measurement of the outer peripheral surface using a hardness meter, at a first time point when a measurement time corresponding to a passage time has just passed since a start of the hardness measurement, and the second hardness value (B) is a value as measured, in the hardness measurement, at a second time point when the measured value of the hardness meter has just been saturated, wherein the passage time is a time it takes for a certain point of the outer peripheral surface to pass through the nip region.

A second aspect of the disclosure may be an image formation apparatus that may include: a development device configured to adhere a developer image using a developer to a surface of a medium; and the fixation device according to the first aspect, wherein the fixation device is configured to fix the developer image to the medium.

According to at least one of the aspects described above, the ratio of the first hardness value to the second hardness value of the annular belt is appropriately set such that the annular belt can be deformed so as to conform to minute roughness formed in the medium during the passage time that the medium pass through the nip region. As a result, the developer adhered to smooth surface portions and minute roughness of the medium can be uniformly fixed, and therefore, an image having uniform gloss can be formed.

Therefore, it is possible to realize a fixation device and an image formation apparatus capable of fixing an image to a medium whose surface has minute roughness with improved image quality.

BRIEF DESCRIPTION OF DRAWINGS

FIG. 10 is a schematic diagram illustrating a relationship between a gloss level and a load hardness ratio of a fixation belt according to a first embodiment;

FIG. 11 is a schematic diagram illustrating a relationship between a thickness of an elastic layer and a load hardness ratio of a fixation belt according to a first embodiment;

FIG. 12 is a schematic diagram illustrating values of parts of a fixation belt according to a second embodiment, measurement results, and a gloss level;

FIGS. 16A and 16B are schematic diagrams illustrating points where a thickness of a fixation belt is measured;

FIGS. 17A and 17B are schematic diagrams illustrating a relationship between a pressure distribution and a thickness of a fixation belt in a nip region;

DETAILED DESCRIPTION

Figure 1:
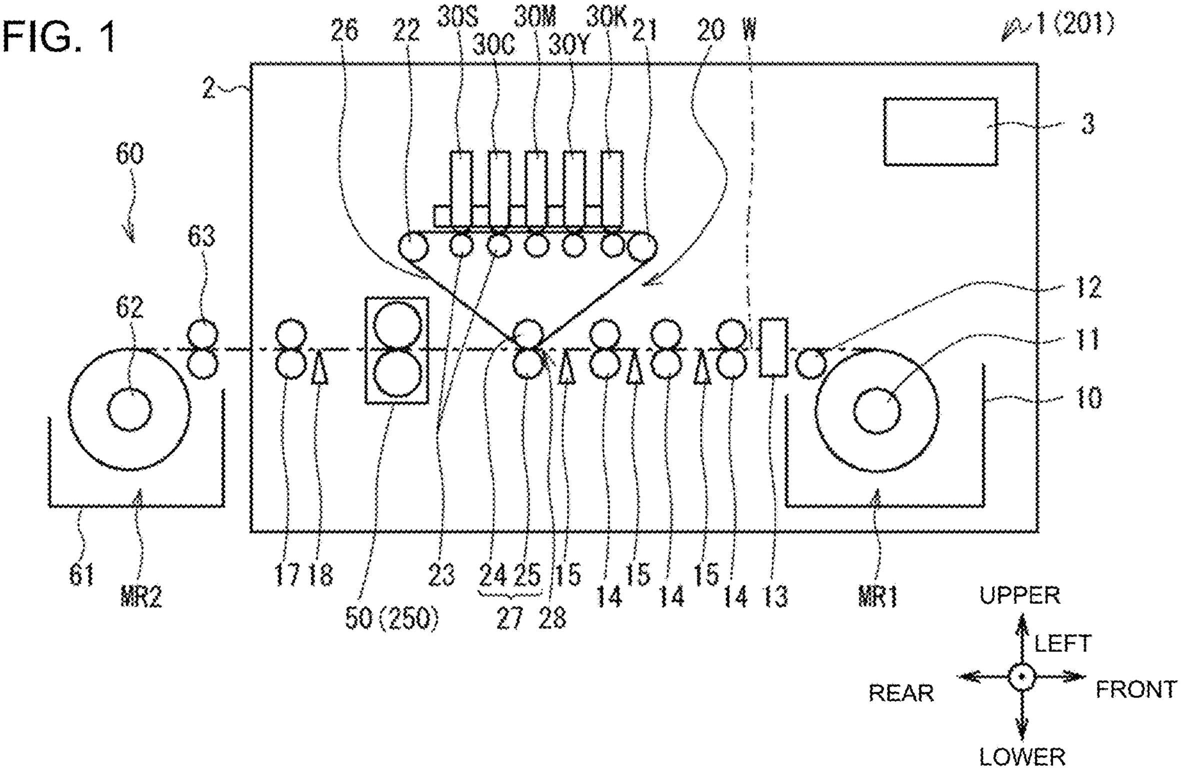
FIG. 1 is a schematic diagram illustrating a configuration of an image formation apparatus.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

1. First Embodiment

1-1. Configuration of Image Formation Apparatus

As illustrated in FIG. 1, an image formation apparatus 1 according to a first embodiment is an electrophotographic printer, and is configured to form, i.e., print a color image on a medium including a film-like medium M.

The image formation apparatus 1 has various parts provided in a housing 2 that is formed in the shape of generally a box. In the following description, a right end portion in FIG. 1 corresponds to a front side of the image formation apparatus 1, and the terms up and down directions, left and right directions, and front and rear directions are used from the viewpoint of a person facing the front side. The image formation apparatus 1 is configured to be suitable for the medium M, the length in the left-right direction of which is 170 mm. An image is formed on the medium M with the medium M being conveyed along a conveyance path described below. Therefore, each part in the image formation apparatus 1 has a length suitable for the medium M in the left-right direction.

All parts of the image formation apparatus 1 are controlled by a controller 3 or a control unit 3. The controller 3 is coupled to a higher-level device such as a computer device (not illustrated), and when receiving print instructions and print data from the higher-level device, executes an image formation process (also referred to as a print process) of forming a printed image on a surface of the medium M.

A medium cassette 10 for containing the medium M is provided at a front portion in the housing 2. The medium cassette 10 is in the shape of a hollow rectangular cuboid as a whole, and is open at the top thereof. A medium feeding shaft 11 is rotatably supported in the medium cassette 10. The long medium M is wrapped around the medium feeding shaft 11 to form a medium feed roll MR1.

A pick-up roller 12 is provided behind and above the medium feeding shaft 11. The pick-up roller 12, which has a cylindrical shape whose central axis extends in the left-right direction, is rotatably supported. The pick-up roller 12, when receiving a drive force from a drive force source (not illustrated), is rotated counterclockwise in the drawing to pick up the medium M from the medium feed roll MR1 and send out the medium M rearward. It should be noted that in the image formation apparatus 1, a conveyance path W along which the medium M is conveyed is formed behind the pick-up roller 12, extending in generally a straight line in the front-rear direction.

A cutter unit 13 is provided behind the pick-up roller 12. The cutter unit 13 cuts the medium M under the control of the controller 3.

Conveyance roller pairs 14 and medium sensors 15 are appropriately provided behind the cutter unit 13 along the conveyance path W. The conveyance roller pair 14 includes a conveyance roller on each of the upper and lower sides of the conveyance path W. Each conveyance roller, which has a cylindrical shape whose central axis extends along the left-right direction, is rotatably supported. One of the conveyance rollers is pressed against the other. The conveyance roller pair 14, whose upper and lower conveyance rollers sandwich the medium M, carries the medium M rearward along the conveyance path W. Each medium sensor 15 detects when the medium M passes by on the conveyance path W, to generate a predetermined detection signal, and sends the detection signal to the controller 3. The controller 3 controls operation of each part based on the detection signals.

An intermediate transfer unit 20 is provided above the conveyance roller pairs 14 and the medium sensors 15. The intermediate transfer unit 20 includes intermediate rollers 21 and 22, five primary transfer rollers 23, a secondary transfer roller 24, a secondary transfer backup roller 25, a intermediate transfer belt 26, and the like. Of them, the intermediate rollers 21 and 22, the five primary transfer rollers 23, the secondary transfer roller 24, and the secondary transfer backup roller 25, all of which have a cylindrical shape whose central axis extends in the left-right direction, are rotatably supported.

The intermediate roller 21 is located above the conveyance roller pairs 14 and the like. The intermediate roller 22 is located behind and relatively far away from the intermediate roller 21. A drive force is transmitted from a drive force source (not illustrated) to the intermediate roller 22. The five primary transfer rollers 23 are sequentially arranged in a straight line between the intermediate rollers 21 and 22 and are substantially equally spaced. A predetermined high voltage is applied to the primary transfer rollers 23.

The secondary transfer roller 24 is located between the intermediate rollers 21 and 22 in the front-rear direction and above and adjacent to the conveyance path W. The secondary transfer backup roller 25 is located immediately below the secondary transfer roller 24 and is in contact with the secondary transfer roller 24. Thus, the secondary transfer roller 24 and the secondary transfer backup roller 25 sandwich the medium M located on the conveyance path W. The secondary transfer roller 24 and the secondary transfer backup roller 25 are hereinafter also collectively referred to as secondary transfer units 27. A portion sandwiches by the two rollers is hereinafter also referred to as a secondary transfer nip portion 28.

The intermediate transfer belt 26, which is a flexible annular belt (a loop belt, or an annular belt), is looped around and supported by the intermediate rollers 21 and 22, the five primary transfer rollers 23, and the secondary transfer roller 24 with tension applied to the belt. In the intermediate transfer unit 20, the intermediate roller 22 and the primary transfer rollers 23 are rotated clockwise in the drawing under the control of the controller 3, so that the intermediate transfer belt 26 moves clockwise in the drawing.

Five processing units 30 (30K, 30Y, 30M, 30C, and 30S) are provided sequentially in the front-rear direction and above the respectively corresponding primary transfer rollers 23. The processing units 30 (30K, 30Y, 30M, 30C, and 30S), which may be referred to as image formation units or development devices, correspond to black (K), yellow (Y), magenta (M), cyan (C), and a special color (S), respectively. The processing units 30 have the same configuration, except for color. The special color is one that is not used in typical color printing, and is, for example, white or clear (transparent).

Figure 2:
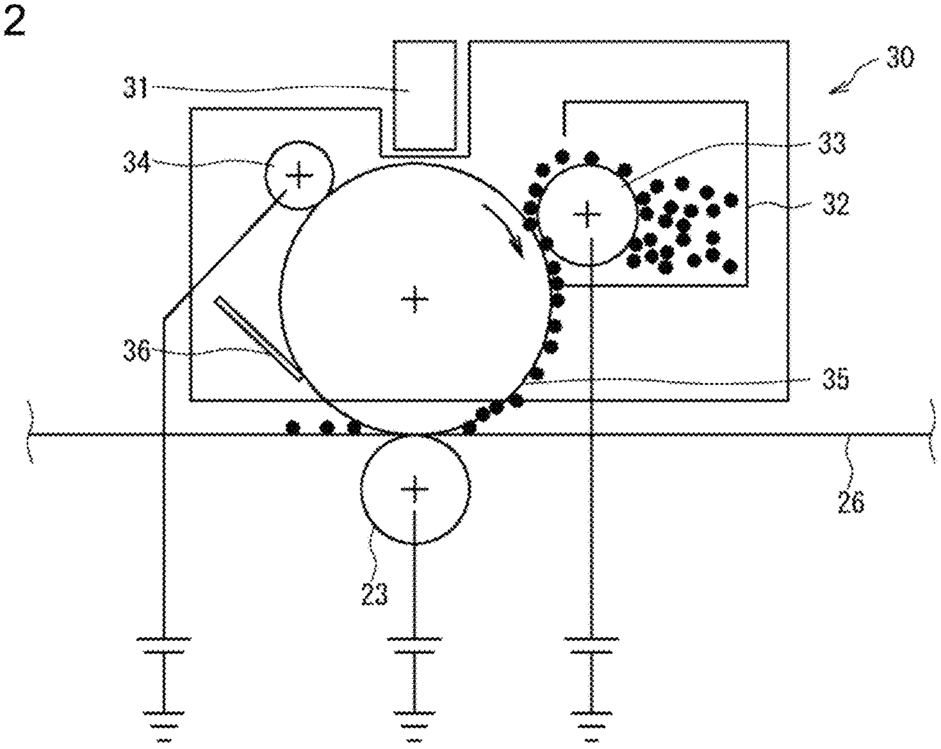
FIG. 2 is a schematic diagram illustrating a configuration of a processing unit.

As illustrated in a schematic side view of FIG. 2, the processing unit 30 is located adjacent to an exposure unit 31. The processing unit 30 has a toner container 32, a feed roller 33, a charging roller 34, a photosensitive drum 35, a development blade 36, and the like. Of them, the rollers and the photosensitive drum 35, which are all formed in the shape of a solid or hollow cylinder whose central axis extends along the left-right direction, are rotatably supported.

In the exposure unit 31, a plurality of light-emitting diodes (LEDs) are provided above the photosensitive drum 35 and are aligned along the left-right direction. The toner container 32 contains toner as a developer. A lower end portion of the photosensitive drum 35 is in contact with the intermediate transfer belt 26. Thus, the intermediate transfer belt 26 is sandwiched between the photosensitive drum 35 and the primary transfer rollers 23.

In the processing unit 30, the photosensitive drum 35 is rotated clockwise in FIG. 2 and the rollers are rotated counterclockwise in FIG. 2 by a drive force supplied from a predetermined drive force source. The charging roller 34 uniformly charges an outer peripheral surface of the photosensitive drum 35. The exposure unit 31 causes each LED to appropriately emit light under the control of the controller 3 and thereby exposes the outer peripheral surface of the photosensitive drum 35 to the light, to form an electrostatic latent image.

The feed roller 33 causes toner in the toner container 32 to adhere to a peripheral side surface thereof and thereby form a thin film of the toner. The photosensitive drum 35 causes toner to be transferred from the feed roller 33 thereto according to the formed electrostatic latent image, so that a toner image (serving as a developer image) is formed thereon. The toner image is transferred to the intermediate transfer belt 26 by a high voltage applied to the primary transfer rollers 23. Toner remaining on the outer peripheral surface of the photosensitive drum 35 is removed by the development blade 36.

The intermediate transfer unit 20 (FIG. 1) moves the intermediate transfer belt 26, so that toner images having the respective colors are sequentially transferred from the processing units 30 to the intermediate transfer belt 26, and when the toner images reach the secondary transfer unit 27, the toner images are transferred to the medium M at the secondary transfer nip portion 28.

A fixation unit 50 is provided behind the secondary transfer unit 27. The fixation unit 50 applies heat and pressure to the medium M while moving the medium M along the conveyance path W, so that the toner image is fixed to a surface of the medium M, and sends out the medium M rearward (details are described below).

A conveyance roller pair 17 and a medium sensor 18 are provided behind the fixation unit 50. The conveyance roller pair 17, which has a configuration similar to that of the conveyance roller pair 14, conveys the medium M rearward. The medium sensor 18, which has a configuration similar to that of the medium sensor 15, detects the medium M and generates a predetermined detection signal, and sends the detection signal to the controller 3. The controller 3 controls an operation of each part based on the detection signal.

A medium winding unit 60 is provided behind the image formation apparatus 1. In the medium winding unit 60, a medium winding shaft 62 is rotatably supported in a medium cassette 61. A conveyance roller pair 63 is provided in front of and above the medium winding shaft 62. The medium winding unit 60 conveys the medium M discharged rearward from the image formation apparatus 1, i.e., the medium M on which an image has been formed, using the conveyance roller pair 63, and then winds that medium M around the medium winding shaft 62, to form a medium-wound roll MR2.

Thus, the image formation apparatus 1 can transfer a toner image formed by the processing units 30 to the medium M while conveying the medium M along the conveyance path W, and fix the toner image using the fixation unit 50, to form, i.e., print an image.

1-2. Configuration of Fixation Unit

Figure 3:
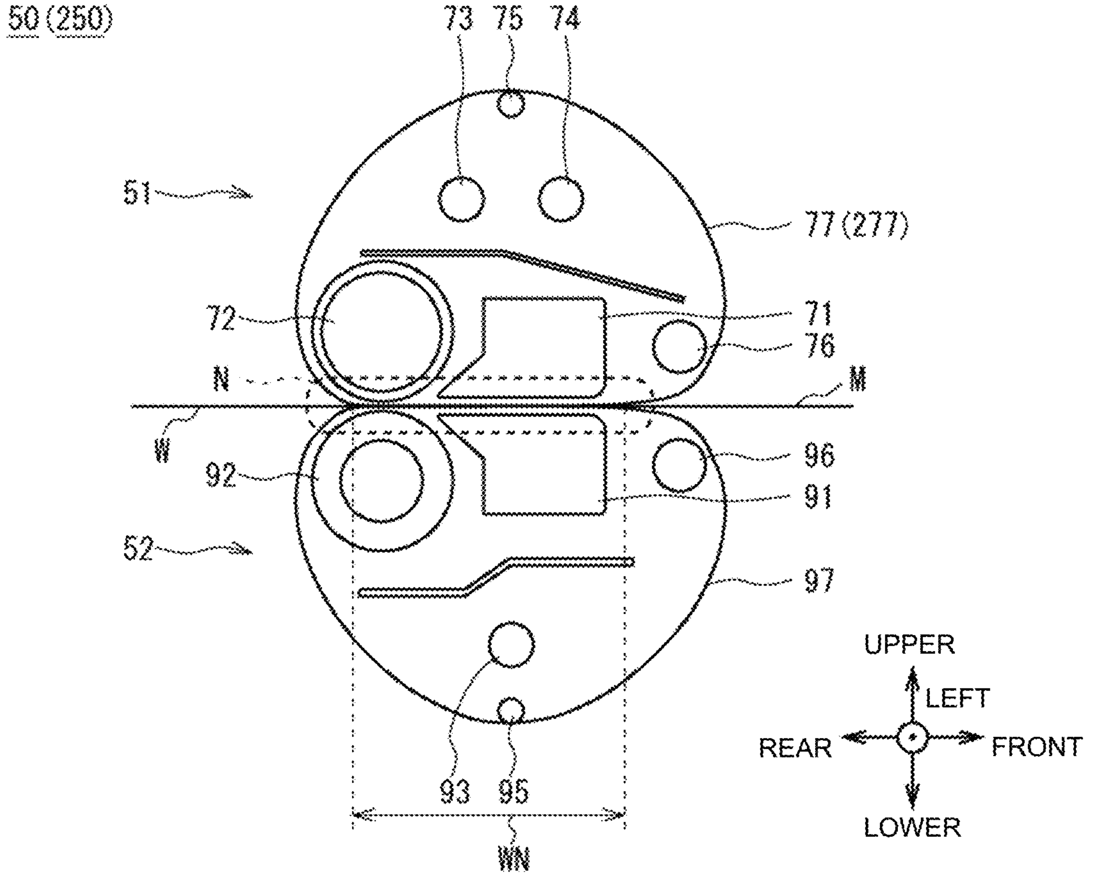
FIG. 3 is a schematic cross-sectional view illustrating a configuration of a fixation unit.

Next, a configuration of the fixation unit 50 is described. FIG. 3 is a schematic cross-sectional view of the fixation unit 50. The fixation unit 50 mainly includes an upper fixation unit 51 located on the upper side of the conveyance path W, and a lower fixation unit 52 located on the lower side of the conveyance path W. The fixation unit 50 has a sufficient length in the left-right direction as with the other parts provided in the image formation apparatus 1.

The upper fixation unit 51 has a pressurization pad 71, a drive roller 72, heaters 73 and 74, guide rollers 75 and 76, a fixation belt 77, and the like.

The shape of the pressurization pad 71 as viewed from the left-right direction is similar to a trapezoid. The pressurization pad 71 has a flat lower surface. The drive roller 72, which is formed in the shape of a cylinder whose central axis extends along the left-right direction, is rotatably supported. The drive roller 72, when receiving a drive force supplied from a drive force source (not illustrated), is rotated clockwise in the drawing. The heaters 73 and 74, when receiving power from a power supply unit (not illustrated), generates heat under the control of the controller 3 (FIG. 1).

The guide roller 75 is located above the pressurization pad 71 and the heaters 73 and 74. The guide roller 76 is located in front of the pressurization pad 71. The guide rollers 75 and 76, which are formed in the shape of a cylinder whose central axis extends along the left-right direction, are rotatably supported.

Figure 4:
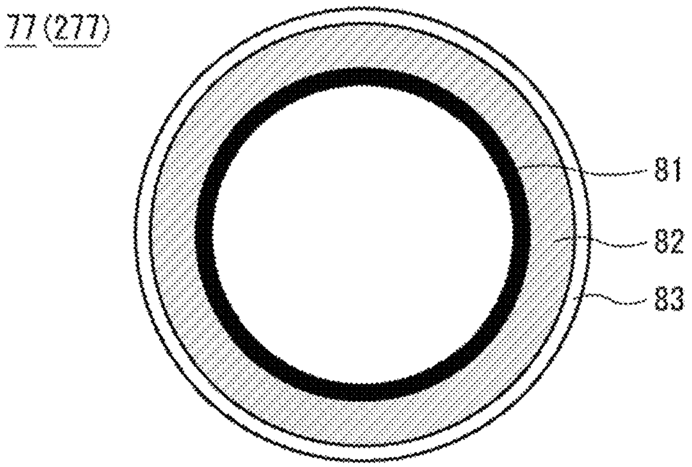
FIG. 4 is a schematic cross-sectional view illustrating a configuration of a fixation belt.

The fixation belt 77 serving as an annular belt is an endless belt that is in the shape of a hollow cylinder and has a sufficient length in the left-right direction. The fixation belt 77 is flexible and resistant to heat. As illustrated in the schematic cross-sectional view of FIG. 4, the fixation belt 77 has a layered structure in which three members, i.e., a base 81, an elastic layer 82, and a surface layer 83, are sequentially stacked. The fixation belt 77 may have an inner diameter of approximately 15 to 60 mm. In this embodiment, the inner diameter of the fixation belt 77 is 42 to 48 mm.

The base 81, which is located at an innermost position of the fixation belt 77, is made of a metal material such as stainless steel. The base 81 may have a thickness of approximately 20 to 60 μm. In this embodiment, the thickness of the base 81 is approximately 40 to 60 μm. Alternatively, the base 81 may be made of a resin material such as polyimide. In that case, the thickness of the base 81 may be approximately 50 to 120 μm.

The elastic layer 82, which is located between the base 81 and the surface layer 83, is made of, for example, silicone rubber. The elastic layer 82 may have a thickness of approximately 100 to 1000 μm. In this embodiment, the thickness of the elastic layer 82 is approximately 300 to 800 μm. The hardness of the silicone rubber included in the elastic layer 82 is preferably approximately 10 to 50° as measured using a Shore durometer (type A) in accordance with JIS K 6253. In this embodiment, the elastic layer 82 is made of a material having a hardness of approximately 30 to 40°.

The surface layer 83, which is located at an outermost position of the fixation belt 77, is made of, for example, a tetrafluoroethylene-perfluoroalkyl vinyl ether copolymer (PFA). The surface layer 83 may have a thickness of approximately 8 to 40 μm. In this embodiment, the thickness of the surface layer 83 is in a range of 15 to 30 μm.

The fixation belt 77 (FIG. 3) is configured to move around the pressurization pad 71, the drive roller 72, and the guide rollers 75 and 76. Therefore, the fixation belt 77 is moved clockwise when the drive roller 72 is rotated clockwise. The fixation belt 77 receives heat from the heaters 73 and 74, and therefore, is heated to a relatively high temperature, for example, 140 to 160° C.

The configuration of the lower fixation unit 52 is substantially symmetric to the configuration of the upper fixation unit 51 with respect to a plane perpendicular to the up-down direction. The lower fixation unit 52 has a pressurization pad 91, a pressurization roller 92, a heater 93, guide rollers 95 and 96, a pressurization belt 97 as a counter member, and the like.

Of them, the pressurization pad 91, the heater 93, the guide rollers 95 and 96, and the pressurization belt 97 have a configuration similar to that of the pressurization pad 71, the heater 73, the guide rollers 75 and 76, and the fixation belt 77, respectively. The pressurization roller 92 is in the shape of a cylinder whose central axis extends along the left-right direction and is rotatably supported as with the drive roller 72, and does not receive a drive force.

In the fixation unit 50, the pressurization pads 71 and 91 are pushed toward each other, and the drive roller 72 and the pressurization roller 92 are also pushed toward each other. As a result, in the fixation unit 50, a portion of the fixation belt 77 that is located in the vicinity of the pressurization pad 71 and the drive roller 72, and a portion of the pressurization belt 97 that is located in the vicinity of the pressurization pad 91 and the pressurization roller 92, are in contact with each other on the conveyance path W. This portion is hereinafter referred to as a nip region N. A length of the nip region N along the conveyance path W in the front-rear direction is hereinafter referred to as a nip width WN. In this embodiment, the nip width WN is 20 to 23 mm.

Figure 5:
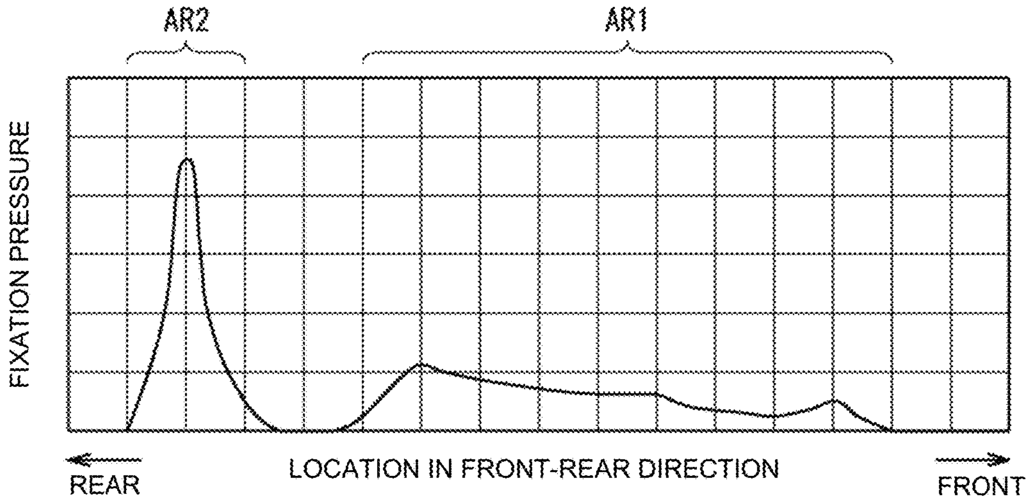
FIG. 5 is a schematic diagram illustrating a pressure distribution in a nip region.

In the nip region N, a pressure applied by the drive roller 72 and the like is higher than that applied by the pressurization pad 71 and the like, which is illustrated by the pressure profile of FIG. 5. In FIG. 5, the horizontal axis represents locations in the front-rear direction, and the vertical axis represents magnitudes of pressure. A region to which a pressure is applied by the pressurization pad 71 and the like is hereinafter referred to as a first load region AR1, and a region to which a pressure is applied by the drive roller 72 and the like is hereinafter referred to as a second load region AR2.

In the fixation unit 50, toner on the medium M is melted by applying a relatively low pressure thereto mainly in the first load region AR1, and the toner is fixed to a surface of the medium M by applying a pressure higher than that of the first load region AR1 thereto mainly in the second load region AR2. In the fixation unit 50, the nip width WN is relatively long compared to the case in which at least one of the fixation belt 77 and the pressurization belt 97, which are located on the upper side and lower side of the conveyance path, is replaced with a single roller, resulting in an increase in fixability.

In the fixation unit 50, a pressure corresponding to a load of 25 to 35 kg is desirably applied between to the upper fixation unit 51 and the lower fixation unit 52 due to a pushing member (not illustrated), the force of gravity, or the like. In this embodiment, the fixation unit 50 is operated with a load of 30 kg applied across a length of 170 mm in the left-right direction between the upper fixation unit 51 and the lower fixation unit 52.

In the image formation apparatus 1, the medium M may be a film, or a medium that causes a relatively great drag when being conveyed, such as so-called coated paper or waterproof paper. In that case, in the image formation apparatus 1, the conveyance speed (paper conveyance speed) of the medium M is reduced compared to the case in which plain paper is used, whereby the efficiency of fixation of toner to the medium M is increased and the fixability is improved.

The image formation apparatus 1 is configured to set, in the case in which the medium M is a film, the conveyance speed to approximately 2 to 6 inches per second (ips), i.e., 50.8 to 152.4 mm/s. In this embodiment, the conveyance speed is 4 ips, i.e., approximately 101.6 mm/s. In this case, as the nip width WN is 20 mm, the time (passage time) it takes for a certain point on the medium M to pass through the nip region N in the fixation unit 50 is approximately 0.2 sec.

Because of such a configuration, when the fixation belt 77 is moved by rotating the drive roller 72, the pressurization belt 97 follows the movement of the fixation belt 77 to move counterclockwise in the drawing. With this operation in the fixation unit 50, when the medium M is being conveyed along the conveyance path W, heat and pressure are applied to a portion of the medium M that is located in the nip region N. As a result, the fixation unit 50 melts a toner of a toner image that has been transferred to the medium M by the secondary transfer unit 27 (FIG. 1), to thereby fix the toner image to the medium M.

1-3. Details of Fixation Belt

Figure 6:
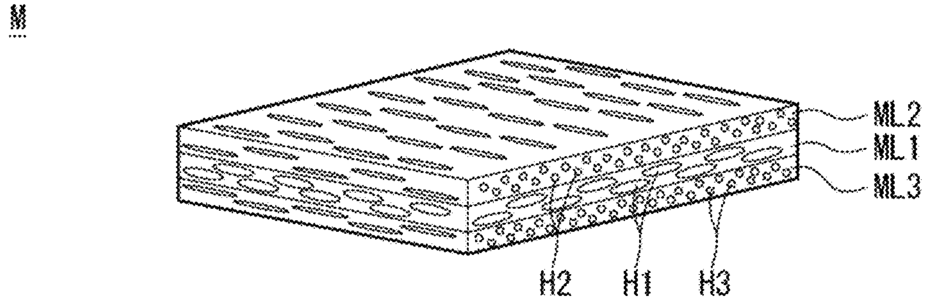
FIG. 6 is a schematic perspective view illustrating a configuration of a medium.

The medium M used in this embodiment is configured in the form of a film as described above. This medium M has, for example, a structure in which covering layers ML2 and ML3 are provided on the opposite respective sides of a base layer ML1, as illustrated by a schematic perspective view of FIG. 6 including cross-sections of the medium.

In the medium M, minute empty pores H1, H2, and H3 are formed in the base layer ML1 and the covering layers ML2 and ML3, respectively, which allows diffuse reflection of light, resulting in an increase in whiteness, and also allows easier writing and a reduction in weight.

For the medium M, for example, when an image including a predetermined region filled with a single color (also called as a filled region or a solid region) is printed using the image formation apparatus 1 or the like, a high-quality finished state having uniform gloss is desired. However, for the medium M, empty pores are formed in each layer, and therefore, when a load (i.e., pressure) is applied to the nip region N of the fixation unit 50, portions of the surface in the vicinity of the empty pores may be locally significantly deformed, so that minute dents D may be formed.

In order to fix a toner image to the medium M having such a structure, the fixation unit 50 desirably causes a portion of the fixation belt 77 to be deformed by an applied load so as to penetrate the dent D and come into contact with an inner surface of the dent D, so that toner is pressed against a surface of the medium M, when the dent D is passing through the nip region N.

Meanwhile, as described above, in the image formation apparatus 1, when the film-like medium M is used, the conveyance speed of the medium M is 4 ips, i.e., approximately 101.6 mm/s, and therefore, the time it takes for the medium M to pass through the nip region N of the fixation unit 50 is approximately 0.2 sec. This suggests that in the fixation unit 50, if the fixation belt 77 can be deformed into a shape that fits the dent D within 0.2 sec after the start of deformation of the medium M due to an applied load with the fixation belt 77 in contact with the medium M, heat and pressure can be appropriately applied to the medium M. In other words, in the image formation apparatus 1, if the deformation rate, hardness, and the like of the fixation belt 77 of the fixation unit 50 fall within the respective appropriate ranges, toner can be appropriately fixed, so that gloss can be imparted to an image, even in the dents D.

Figure 7A:
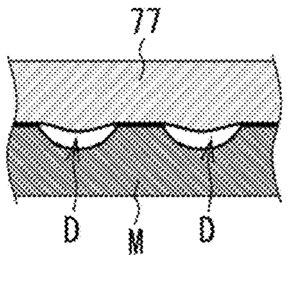
FIGS. 7A to 7C are schematic diagrams illustrating a deformation of a heating belt, depending on dents in a medium.
Figure 7B:
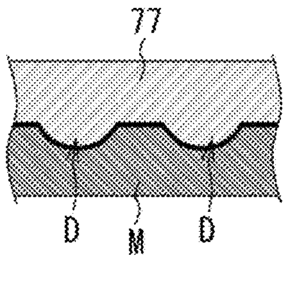
Figure 7C:
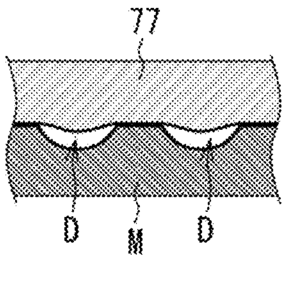

Here, a relationship between the deformation rate and hardness of the fixation belt 77 and the ability of the fixation belt 77 to follow the medium M is described with reference to FIGS. 7A to 7C. FIGS. 7A to 7C are cross-sectional views schematically illustrating how the fixation belt 77 is in contact with a surface of the medium M having the dents D, in the nip region N.

For example, as illustrated in FIG. 7A, in the case in which the hardness of the fixation belt 77 is relatively low and therefore the deformation rate is relatively slow, the fixation belt 77 cannot fully penetrate into the dent D, so that heat and pressure cannot be sufficiently transmitted to toner on the inner surface of the dent D. In other words, at that time, the fixation belt 77 delays following, or poorly responds to, the shape of the medium M including the dents D, and therefore, cannot sufficiently follow the medium M within the passage time. In that case, gloss is not obtained at local portions of the medium M where the dents D are formed, so that so-called gloss irregularity occurs, resulting in a low image quality rating.

Meanwhile, as illustrated in FIG. 7B, in the case in which the hardness of the fixation belt 77 falls within an appropriate range and the deformation rate is appropriate, the fixation belt 77 can fully penetrate into the dent D, and therefore, heat and pressure can be sufficiently transmitted to the inner surface of the dent D. In other words, at that time, the fixation belt 77 can highly follow and respond better to the shape of the medium M including the dents D. In that case, portions of the medium M where the dents D are formed have a sufficient level of gloss, resulting in uniform gloss, and therefore, a high image quality rating.

Furthermore, as illustrated in FIG. 7C, in the case in which the hardness of the fixation belt 77 is relatively high, the fixation belt 77 cannot fully penetrate into the dent D, so that heat and pressure cannot be sufficiently transmitted to toner on the inner surface of the dent D. In other words, at that time, the fixation belt 77 poorly follows and responds to the shape of the medium M including the dents D. In that case, gloss is not obtained at local portions of the medium M where the dents D are formed, so that so-called gloss irregularity occurs, resulting in a low image quality rating, as in FIG. 7A.

Thus, it is considered that in the fixation unit 50, if the hardness and deformation rate of the fixation belt 77 fall within the respective appropriate ranges, the fixation belt 77 can appropriately follow the shape of the medium M, and therefore, toner can be satisfactorily fixed to each portion of the medium M, resulting in a reduction in the possibility that gloss irregularity occurs.

Incidentally, the hardness of a relatively thin member such as the fixation belt 77 is typically measured using a so-called micro-hardness gauge. In this micro-hardness gauge, for example, an indenter (or a measurement terminal) having a cylindrical shape is brought into contact with a test piece, and is pushed into the test piece at a predetermined load and rate. The hardness of the test piece can be measured based on the displacement of the indenter.

In this embodiment, a micro durometer, "MD-1capa," manufactured by Kobunshi Keiki Co., Ltd., is used as the micro-hardness gauge. Also, in this embodiment, an indenter having a cylindrical shape with a diameter of 0.16 mm is used for measurement. The lowering speed (i.e., pushing speed or indention speed) and applied load of the indenter are 3.2 mm/s and 22 to 332 Nm, respectively.

Figures 8, 9:
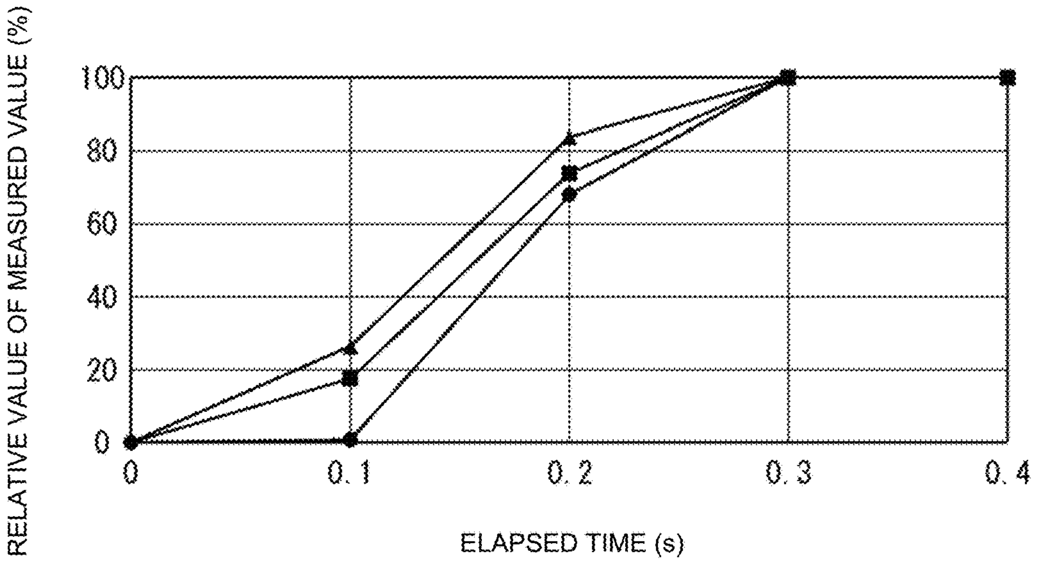
FIG. 8 is a schematic diagram illustrating changes over time of a value measured by a micro-hardness gauge.
FIG. 9 is a schematic diagram illustrating values of parts of a fixation belt according to a first embodiment, measurement results, and a gloss level.

FIG. 8 is a graph illustrating an ex ample of changes in measured values over time of different fixation belts 77 having different structures that are obtained by the micro-hardness gauge. The vertical axis represents hardness values that are a relative value (%) with respect to the finally saturated hardness value (hereinafter referred to as a saturated hardness value). The horizontal axis represents elapsed times from the start of measurement that are plotted at regular intervals of 0.1 seconds. A characteristic curve obtained by connecting plots together in FIG. 8 is hereinafter referred to as a profile.

FIG. 8 indicates that the measured value obtained by the micro-hardness gauge increases with the elapsed time after the start of measurement, and the profile shape varies depending on the structure of the fixation belt 77. Thus, the different profile shapes of the fixation belt 77 represent different deformation rates of the fixation belt 77.

Therefore, in this embodiment, the hardness of the fixation belt 77 is measured using the micro-hardness gauge. In this embodiment, the measured value (hereinafter referred to as a load hardness value) at the time that 0.2 sec has just passed since the start of measurement is considered to correspond to the deformation rate of the fixation belt 77. The 0.2-sec time period is hereinafter also referred to as a measurement time.

Furthermore, in this embodiment, a relationship between the load hardness value of the fixation belt 77 and the quality of an image printed on the medium M using the fixation belt 77 is investigated. Furthermore, in this embodiment, the load hardness value is represented as a relative ratio (hereinafter referred to as a load hardness ratio) with respect to the saturated hardness value, which is a finally converged hardness value, whereby the hardness value is normalized for facilitation of comparison. For the sake of convenience, the load hardness value and the saturated hardness value are hereinafter also referred to as a first hardness value and a second hardness value, respectively.

Specifically, in this embodiment, in an assessment test, five fixation belts 77 (77A to 77E) having different elastic layers 82 and different surface layers 83 are prepared, and the hardness of each fixation belt 77 is measured using a micro-hardness gauge.

In this assessment test, concerning specifications of each fixation belt 77, the thickness (μm) of the elastic layer 82, the hardness)(° of the elastic layer 82, and the thickness (μm) of the surface layer 83 are measured. Of them, the thickness of the elastic layer 82 is measured at several separate points in the left-right direction (also referred to as a width direction), and the greatest and smallest values are identified and the average value is calculated for each fixation belt 77.

FIG. 9 illustrates a table TBL1 in which specifications and measurement results of the fixation belts 77 are enumerated. In the table TBL1, the specifications of each fixation belt 77 are the greatest, smallest, and average values of the thickness (μm) of the elastic layer 82, the hardness)(° of the elastic layer 82, and the thickness (μm) of the surface layer 83.

The table TBL1 also illustrates the measured saturated hardness value) (° and load hardness value)(° of each fixation belt 77, and the load hardness ratio calculated based on these values. It should be noted that the load hardness ratio of each fixation belt 77 are measured at several separate points in the left-right direction, the greatest, smallest, and average values of the load hardness ratio are rounded to the nearest thousandth, and the resultant values are indicated in the table TBL1. For the saturated hardness value and the load hardness value, only the average value of values of each fixation belt 77 measured at separate points in the left-right direction is illustrated.

Next, in this embodiment, each fixation belt 77 (77A to 77E) is used in the fixation unit 50 of the image formation apparatus 1, a print test in which a test image described below is printed is conducted using the abovementioned film-like medium M, and the print result is assessed. In the print test, "Pro1050," manufactured by Oki Electric Industry Co., Ltd., is used as the image formation apparatus 1. The conveyance speed of the medium M is 4 ips, i.e., approximately 101.6 mm/s.

In this print test, an image obtained by uniformly filling the entire surface with a mixture of cyan and magenta (so-called a full solid image or a fully-filled image) is used as a test image. If the printed medium M has gloss irregularity, the medium M may have minute roughness on the surface, i.e., the surface may be uneven. In other words, for the medium M, as the area of even surface portions decreases and the area of uneven surface portions increases, the degree of gloss irregularity may increase.

With the above in mind, in this embodiment, the print result of the medium M is rated on a scale based on the ratio of the area of even surface portions to the area of the surface of the medium M. There are several scale levels. Each scale level has a high correlation with the degree of occurrence of gloss irregularity. Therefore, in this embodiment, by using the ratio of even surface portions to the surface of the printed medium M, the degree of occurrence of gloss irregularity on the medium M is expressed by an objective index.

Specifically, in this embodiment, a test image is printed on the medium M by the image formation apparatus 1 in which one of the fixation belts 77 is included in the fixation unit 50. In this embodiment, "Yupotack (registered trademark) base paper (high functional product)," manufactured by Yupo Corporation, is used as the medium M.

Next, in this embodiment, the shape of the surface of the medium M is observed and imaged using a laser microscope to capture a microscopic image. In this embodiment, a confocal microscope, "Optelics (registered trademark) Hybrid," manufactured by Lasertec Corporation, is used as the laser microscope.

Following this, in this embodiment, thresholding is performed based on the luminance of each pixel of the microscopic image obtained by the laser microscope, whereby the microscopic image is segmented into even surface portions and uneven surface portions. Furthermore, in this embodiment, the ratio of the area of the even surface portions to the area of the entire microscopic image is calculated, which is referred to as a toner even surface area ratio (%). Here, properties of the laser microscope are set as follows.

Amount of light: 50(%)

Brightness: 500

Objective lens: 10× (magnification factor: 185)

Number of segments in patchwork: 8 columns×8 rows (image region of 11 mm×11 mm)

Thresholding method: luminance value even surface portion extraction threshold: 85 to 190 (luminance value)

Furthermore, in this embodiment, the following thresholds are set for the calculated toner even surface area ratio (%) so that gloss irregularity (gloss level) is rated on a scale of 1 ("level 1": relatively significant gloss irregularity) to 10 ("level 10": substantially no gloss irregularity). The threshold value for each rated level is appropriately set such that a significant difference can be recognized between each level when the gloss irregularity is visually observed for different media M having different toner even surface area ratios (%).

Incidentally, in this assessment test, for each fixation belt 77, while a plurality of load hardness ratios are calculated based on saturated hardness values and the like that are measured at a plurality of separate points in the left-right direction, the gloss level of each individual fixation belt 77 is represented by a single level, whose value is indicated in the table TBL1 (FIG. 9).

In the fixation belt 77, the elastic layer 82 has a relatively great thickness, and therefore, the surface layer 83 may not withstand pressure in the nip region N and may then crack (hereinafter referred to as surface layer cracking), so that the image quality of a formed image may significantly decrease. Therefore, in this assessment test, the presence or absence of the surface layer cracking is also assessed. The result is indicated in the table TBL1 (FIG. 9).

Furthermore, in this assessment test, each fixation belt 77 is comprehensively assessed based on, for example, findings related to the gloss level, the surface layer cracking, and the hardness of the elastic layer 82, and is rated on a scale of three levels represented by symbols, i.e., an circle, a triangle, and a cross. The result is indicated in the table TBL1 (FIG. 9).

The circle symbol represents a high rating, i.e., the gloss level is five or more, and no problems such as surface layer cracking do not occur. The triangle symbol represents a moderate rating, i.e., the gloss level is five or more, and some problem such as surface layer cracking occurs. An example of this problem is that, for example, the load hardness ratio is relatively high, e.g., more than 0.700, and therefore, the elastic layer 82 is too hard, resulting in a decrease in fixation rate, particularly when a plurality of colors are mixed. The cross symbol represents a low rating, i.e., the gloss level is four or less.

FIG. 10 is a graph plotted based on the values of the fixation belts 77, where the horizontal axis and the vertical axis represent load hardness ratios and ratings, respectively. FIG. 11 is a graph plotted based on the values of the fixation belts 77, where the horizontal axis and the vertical axis represent the thicknesses and load hardness ratios of the elastic layers 82. In the graphs, the overall ratings (symbols) are also plotted.

In FIGS. 10 and 11, for each fixation belt 77, the load hardness ratios obtained at several separate points in the left-right direction are plotted. Therefore, in FIG. 10, a plurality of plotted points related to an individual fixation belt 77 are distributed across the range from the smallest to greatest values of the load hardness ratio.

A correlation between the load hardness ratio and the rating, and the like, in the assessment test is described below with reference to FIGS. 9, 10, and 11.

In this assessment test, in FIG. 10, in the case in which the value of the load hardness ratio is 0.566 (56.6%) or more, the rating is 5 or more. In that case, in the fixation unit 50, as illustrated in FIG. 7B, the response of the fixation belt 77 to the pushing operation is relatively quick, and therefore, the ability to follow the dent D formed in the medium M may be high. Therefore, the image formation apparatus 1 can uniformly apply heat and pressure to every portion of the medium M in the nip region N of the fixation unit 50, resulting in a satisfactory reduction in gloss irregularity in an image printed on the medium M.

Also, in this assessment test, in FIG. 10, in the case in which, given the upper limit of the load hardness ratio, the load hardness ratio is 0.898 (89.8%) or less, i.e., within a range R1, the rating can be regarded as being 5 or more. In that case, in the fixation unit 50, as illustrated in FIG. 7B, the response of the fixation belt 77 to the pushing operation is also relatively quick, and therefore, the ability to follow the dent D formed in the medium M may be high. In that case, the thickness of the elastic layer 82 is in the range of 377 to 834 μm.

In this assessment test, in FIG. 11, in the case in which the value of the load hardness ratio is in a range R2 of 0.566 (56.6%) to 0.698 (69.8%) and the thickness of the elastic layer 82 is in a range R3 of 377 to 607 μm, the rating is 5 or more, and another problem does not arise. In that case, the response of the fixation unit 50 to the pushing operation is also relatively quick, and in addition, the thickness and hardness of the elastic layer 82 may not be too great and may be in an appropriate range. Therefore, the image formation apparatus 1 can significantly reduce gloss irregularity in an image printed on the medium M, and substantially avoid image cracking and a reduction in fixation rate, resulting in a very high quality print result.

Meanwhile, in this assessment test, in the case in which the value of the load hardness ratio is less than 0.566, the rating is 4 or less. In that case, in the fixation unit 50, as illustrated in FIG. 7A, the response of the fixation belt 77 to the pushing operation is relatively slow, and therefore, the ability to follow the dent D formed in the medium M may be low. As a result, the image formation apparatus 1 produces gloss irregularity in an image printed on the medium M to a relatively large extent.

Thus, this assessment test demonstrates the phenomenon that the degree of occurrence of gloss irregularity in an image printed on the medium M varies depending on the value of the load hardness ratio. This assessment test also demonstrates the load hardness ratio range and load hardness value range in which the degree of occurrence of gloss irregularity can be satisfactorily reduced.

With the above in mind, in the fixation unit 50 of the image formation apparatus 1 of this embodiment, the value of the load hardness ratio of the fixation belt 77 is set to 0.566 or more, and preferably 0.898 or less, more preferably 0.698 or less. In the fixation unit 50 of the image formation apparatus 1, the thickness of the elastic layer 82 of the fixation belt 77 is set within the range of 377 to 607 μm.

It should be noted that for the fixation belt 77 in the fixation unit 50, if the value of the hardness ratio has reached 0.566 or more by the end of passage through the nip region N (nip passage end time), the occurrence of gloss irregularity can be substantially prevented in any of the even portions and dents D of the medium M. Therefore, the duration of measurement of the hardness value by a hardness meter in order to obtain the hardness ratio of the fixation belt 77 may be 0.2 sec or less.

Specifically, in this embodiment, the nip width WN is 20 mm. Therefore, for example, in the case in which the conveyance speed is 50.8 mm/s, the nip passage end time is 0.39 sec. In that case, the measurement time of the hardness value by a hardness meter is 0.39 sec. For example, in the case in which the conveyance speed is 152.4 mm/s, the nip passage end time is 0.13 sec. In that case, the measurement time of the hardness value by a hardness meter is 0.13 sec. Therefore, in this embodiment, preferably, the value of the hardness ratio has reached 0.566 or more when the time it takes to pass through the nip region, specifically 0.26±0.13 sec, has just passed.

1-4. Effects and the Like

In the above configuration, the image formation apparatus 1 according to a first embodiment has the feature that in the case in which an image is printed on the film-like medium M, the fixation belt 77 of the fixation unit 50 is sufficiently deformed during the time it takes for the medium M to pass through the nip region N. Specifically, in the image formation apparatus 1, the value of the load hardness ratio of the fixation belt 77 employed therein is 0.566 or more as measured using a micro-hardness gauge.

As a result, in the image formation apparatus 1, the shape of the fixation belt 77 can be reliably deformed so as to conform to the shape of the dent D of the medium M and come into contact with the surface of the dent D during approximately 0.2 sec, which is the time it takes for the medium M to pass through the nip region N of the fixation unit 50 (FIG. 7B). Thus, in the image formation apparatus 1, the fixation belt 77 can apply heat and pressure to toner, which can in turn be sufficiently fixed to any of the even portions and the dents D of the medium M, whereby uniform gloss without irregularity can be imparted to an image printed on the medium M. In particular, the image formation apparatus 1 can impart uniform gloss without irregularity to an image printed on the film-like medium M, in which minute empty pores are formed in order to enhance flexibility or the like.

In addition, in the image formation apparatus 1, the value of the load hardness ratio of the fixation belt 77 of the fixation unit 50 may be 0.566 to 0.898, i.e., in the range R1 of FIG. 10. In that case, the image formation apparatus 1 can satisfactorily avoid the problem that the hardness of the elastic layer 82 is too high, and therefore, the ability to follow the medium M is deteriorated, so that gloss irregularity occurs in a printed image.

Furthermore, in the image formation apparatus 1, the fixation belt 77 of the fixation unit 50 may be configured such that the value of the load hardness ratio is 0.566 to 0.698, and the thickness of the elastic layer 82 is in the range of 377 to 607 μm, i.e., are in the ranges R2 and R3, respectively, of FIG. 11. In that case, the image formation apparatus 1 can substantially avoid the problem that when the thickness of the elastic layer 82 of the fixation belt 77 is great, the surface layer 83 may not withstand pressure in the nip region N and may then crack, so that the image quality of an image may significantly decrease.

In particular, in this embodiment, of measured values obtained by a micro-hardness gauge, the load hardness value that is measured when 0.2 sec has just passed since the start of measurement is used, instead of the so-called hardness, i.e., saturated hardness value, of the fixation belt 77. Also, in this embodiment, the period of time of 0.2 sec is the time it takes for the medium M to pass through the nip region N, and specifically, is calculated based on the conveyance speed of the medium M and the length of the nip region N, i.e., the nip width WN. Therefore, in the image formation apparatus 1, an appropriate fixation belt 77 can be employed that can be successfully deformed so as to conform to the shape of the dent D during the time when the medium M is passing through the nip region N.

From another viewpoint, in this embodiment, a micro-hardness gauge is used by a technique that is partially different from the typical one. Typically, when a micro-hardness gauge is used, an indenter is pressed against an object to be measured, and a measured value becomes stable after a certain period of time has passed, and the measured value at that time is regarded as a hardness value (i.e., a saturated hardness value).

In contrast to this, in this embodiment, it is assumed that changes over time of the fixation belt 77 that occur when the indenter of a micro-hardness gauge is pressed against the fixation belt 77 are very similar to those of the fixation belt 77 that occur when the fixation belt 77 is in contact with the dent D of the medium M. As a result, in this embodiment, changes over time of the shape of the fixation belt 77 can be captured by sequentially reading changes over time of the measured value obtained by a micro-hardness gauge.

From still another viewpoint, in the image formation apparatus 1, in order to satisfactorily fix toner to the film-like medium M, the fixation unit 50 is configured such that the nip region N has a relatively long nip width WN. Specifically, in the fixation unit 50, instead of configuring the upper fixation unit 51 as a simple roller, the upper fixation unit 51 is configured such that the fixation belt 77 is looped around the pressurization pad 71 and the like and the drive roller 72 and the like, and the lower fixation unit 52 is also similarly configured. In the fixation unit 50, which has such a configuration, it is desirable that the fixation belt 77 and the like be relatively thin. Therefore, it is difficult for the fixation belt 77 to have a sufficient thickness, and therefore, it is also difficult to select the hardness of the fixation belt 77.

In this regard, in this embodiment, attention is paid to the followability and response of the fixation belt 77 during the time (i.e., 0.2 sec) it takes for the fixation belt 77 to pass through the nip region N, and a satisfactory range R1 (FIG. 10) and the like are identified using the load hardness ratio as an index. Therefore, in the image formation apparatus 1, the followability and response of the fixation belt 77, which is relatively thin, can be appropriately improved while ensuring a relatively great nip width WN in the fixation unit 50 (FIG. 3), resulting in satisfactory gloss in a formed image.

Also, in this embodiment, the toner even surface area ratio based on the luminances of individual pixels in a microscopic image is used as an index, and the rating is classified according to the value of the index. Therefore, in this embodiment, each fixation belt 77 can be objectively and appropriately rated in terms of the presence or absence and degree of gloss irregularity on a definite scale based on a uniform criterion instead of an indefinite scale based on visual inspection. As a result, in the image formation apparatus 1, by using an appropriate fixation belt 77 selected based on an appropriate rating, an image that has sufficient gloss with substantially no gloss irregularity can be printed on the medium M.

With the above configuration, in the image formation apparatus 1 according to a first embodiment, the fixation belt 77 of the fixation unit 50 is configured such that the value of the load hardness ratio of the fixation belt 77 as measured using a micro-hardness gauge is 0.566 or more, for printing an image on the film-like medium M. Therefore, in the image formation apparatus 1, the fixation belt 77 can be reliably deformed so as to conform to the shape of the minute dent D of the medium M during approximately 0.2 sec when the fixation belt 77 is passing through the nip region N of the fixation unit 50. As a result, the image formation apparatus 1 can sufficiently fix toner to any of the even portions (smooth portions) and the dents D of the medium M. Therefore, the occurrence of gloss irregularity can be reduced in an image printed on the medium M, so that the image can have uniform gloss.

2. Second Embodiment

An image formation apparatus 201 (FIG. 1) according to a second embodiment is similar to the image formation apparatus 1 according to a first embodiment, except that the image formation apparatus 201 includes a fixation unit 250 in place of the fixation unit 50. The fixation unit 250 (FIG. 3) is different from the fixation unit 50 according to a first embodiment in that the fixation unit 250 has a fixation belt 277 in place of the fixation belt 77. In the fixation belt 277, a base 81, an elastic layer 82, and a surface layer 83 are sequentially stacked as in the fixation belt 77 (FIG. 4) according to a first embodiment.

2-1. Details of Fixation Belt

In a second embodiment, for an assessment test on the thickness of the elastic layer 82 of the fixation belt 277, measurement of a load hardness value and the like using a micro-hardness gauge, and rating of gloss irregularity, are initially conducted for several fixation belts 277 as in a first embodiment.

Specifically, in an assessment test of a second embodiment, seven fixation belts 277 (277A to 277G) are used. In a table TBL2 illustrated in FIG. 12, a portion of the specifications, ratings, and overall ratings of the fixation belts 277 in the assessment test are enumerated.

In the assessment test, in the case in which the thickness of the elastic layer 82 is less than 377 μm, the degree of occurrence of gloss irregularity is relatively great, so that the rating is 4 or less. Meanwhile, in the assessment test, in the case in which the thickness of the elastic layer 82 is 377 μm, the degree of occurrence of gloss irregularity is relatively small in an image printed on the medium M, so that satisfactory gloss is obtained, i.e., the rating is 5 or more.

Also, in the assessment test, in the case in which the thickness of the elastic layer 82 is 607 μm or less, surface layer cracking does not occur in the surface layer 83, resulting in satisfactory image quality of an image printed on the medium M. Meanwhile, in the assessment test, in the case in which the thickness of the elastic layer 82 is more than 607 μm, surface layer cracking occurs in the surface layer 83, and a reduction in the image quality of an image printed on the medium M is observed.

Based on these results, in the assessment test, in the case in which the thickness of the elastic layer 82 is in the range of 377 to 607 μm, the overall rating is high, which is represented by a circle symbol in the table TBL2. Meanwhile, in the assessment test, in the case in which the thickness of the elastic layer 82 is smaller than 377 μm or greater than 607 μm, the overall rating is low, which is represented by the cross symbol in the table TBL2.

Figure 13:
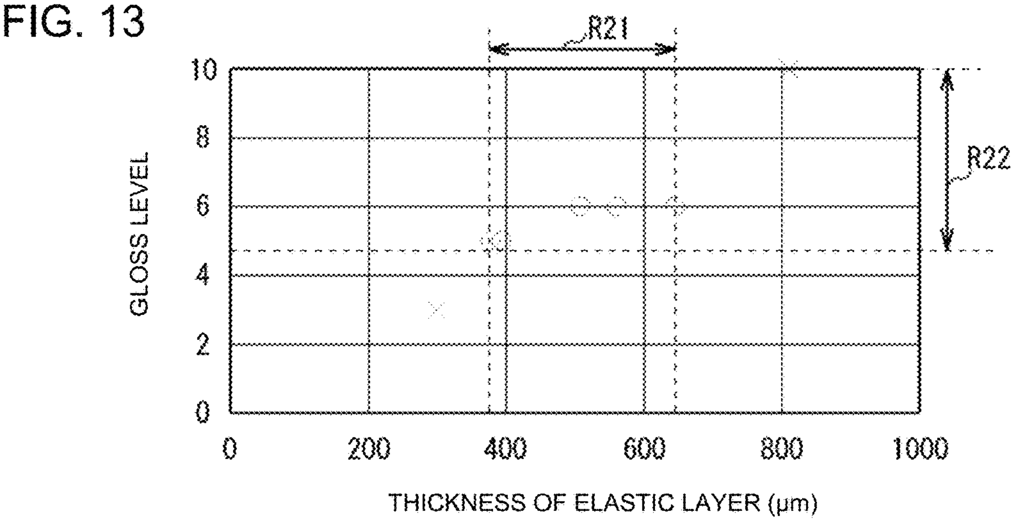
FIG. 13 is a schematic diagram illustrating a relationship between a gloss level and a thickness of an elastic layer of a fixation belt according to a second embodiment.

FIG. 13 is a graph in which the values of the fixation belts 277 are plotted, where the horizontal axis represents the thicknesses of the elastic layers 82, and the vertical axis represents gloss levels, in the assessment test. In the graph of FIG. 13, the symbols for the overall rating are plotted. As can be seen from FIG. 13, in a range R21 that the thickness of the elastic layer 82 is 377 μm or more and 607 μm or less, a range R22 that the value of the gloss level is 5 or more exists.

Incidentally, in the image formation apparatus 201, in some cases, although a fixation belt 277 having a high overall rating is used, a problem arises in the image quality of an image printed on the medium M.

Figure 14A:
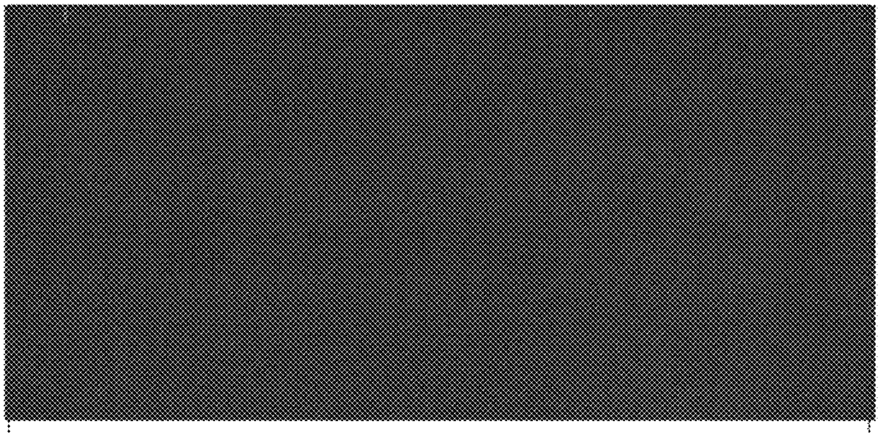
FIGS. 14A and 14B are schematic diagrams illustrating a relationship between a printed image and a thickness of a fixation belt when image dropout does not occur.

For example, FIG. 14A illustrates the result of printing of a test image (i.e., a full solid image) similar to that in the assessment test of a first embodiment, using a certain fixation belt 277 (hereinafter referred to as a fixation belt 277J) in the image formation apparatus 201. FIG. 14A illustrates a range of the medium M on which an image is printed and which has a length corresponding to the entire loop of the fixation belt 277. As illustrated in FIG. 14A, no problem arises in image quality in the case where the fixation belt 277J is used.

Meanwhile, FIG. 15A, which is to be compared with FIG. 14A, illustrates the result of printing of the same test image in a case where another fixation belt 277 (hereinafter referred to as a fixation belt 277K) is used in the image formation apparatus 201. As can be seen from FIG. 15A, in the case where the fixation belt 277K is used, toner is not sufficiently fixed to a portion of the image on the medium M, which exhibits a color close to white, which is the original color of the medium M (such a phenomenon is hereinafter referred to as image dropout).

Here, in this embodiment, attention is paid to the thickness of the fixation belt 277 (hereinafter referred to as a film thickness). A plurality of measurement points are set on the fixation belt 277. The film thickness (the belt thickness) is measured at each measurement point using a film thickness measurement device (not illustrated).

As illustrated in the schematic diagram of FIG. 16A, the measurement points of the fixation belt 277 are arranged in the left-right direction (that is, a width direction of the fixation belt) at widthwise intervals LA1 (e.g., 26 mm) from a location at a widthwise interval LA0 (e.g., 6 mm) away from the left end of the fixation belt 277. The locations of the measurement points are hereinafter referred to as measurement locations PA1, PA2, . . . , sequentially from the left side. As illustrated in the schematic diagram of FIG. 14B, at each of the measurement locations, the thickness are measured at circumferential direction intervals LC1 (e.g., 0.4 mm) along the circumferential direction of the fixation belt 277.

Figure 14B:
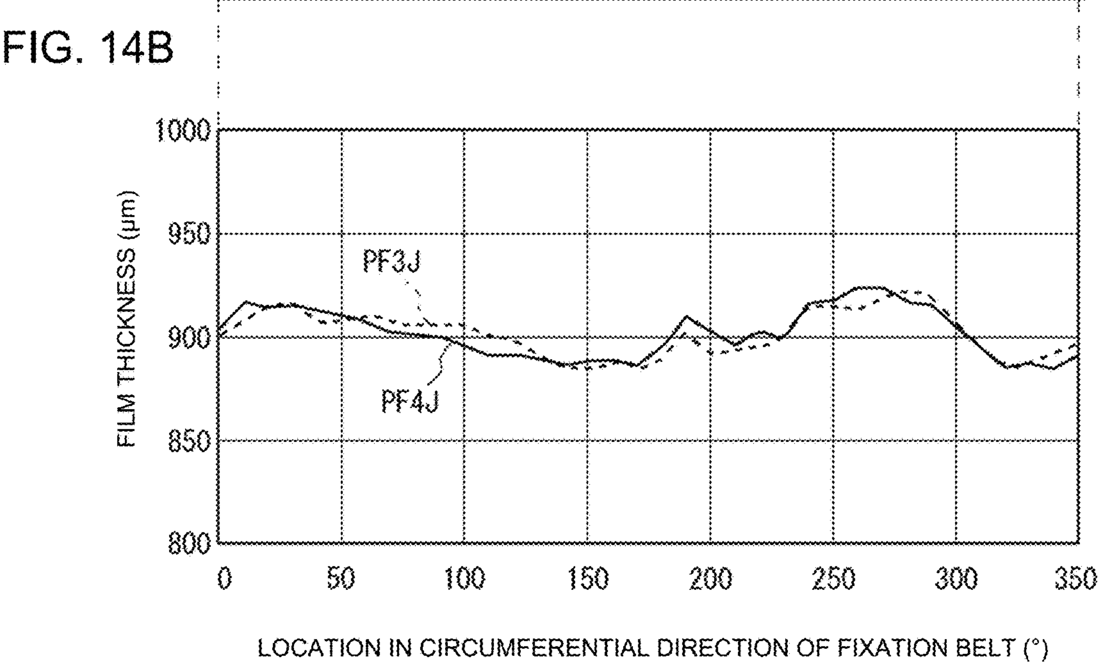

Initially, for the fixation belt 277J, the film thickness (the belt thickness) is measured at measurement points along the circumferential direction at each of the measurement locations PA3 and PA4. As a result, film thickness distribution curves PF3J and PF4J of the fixation belt 277J are obtained as illustrated in FIG. 14B. Such film thickness distribution curves are hereinafter also referred to as a film thickness profile. In FIG. 14B, the horizontal axis represents locations in the circumferential direction of the fixation belt, which are expressed by an angle)(°, and the vertical axis represents film thicknesses (μm) of the fixation belt.

As illustrated in FIG. 14B, which illustrate the film thickness profiles of the fixation belt 277*j*, the film thickness varies to some extent, depending on the location in the circumferential direction, in both of the film thickness distribution curves PF3J and PF4J. However, the absolute value of the film thickness at each location in the circumferential direction, the locations in the circumferential direction at which a change occurs (hereinafter also referred to as phases), and the degrees of changes are almost the same between the film thickness distribution curves PF3J and PF4J. In other words, the degree of waveform similarity between the film thickness distribution curves PF3J and PF4J is relatively high. In addition, almost no positional deviation (hereinafter also referred to as a phase difference) occurs in the circumferential direction.

Next, for the fixation belt 277K, the film thickness (the belt thickness) is measured at each measurement points in the circumferential direction at each of the measurement locations PA3 and PA4. As a result, film thickness distribution curves PF3K (dashed line) and PF4K (solid line) of the fixation belt 277K are obtained as illustrated in FIG. 15B, which is to be compared with FIG. 14B.

Figure 15A:
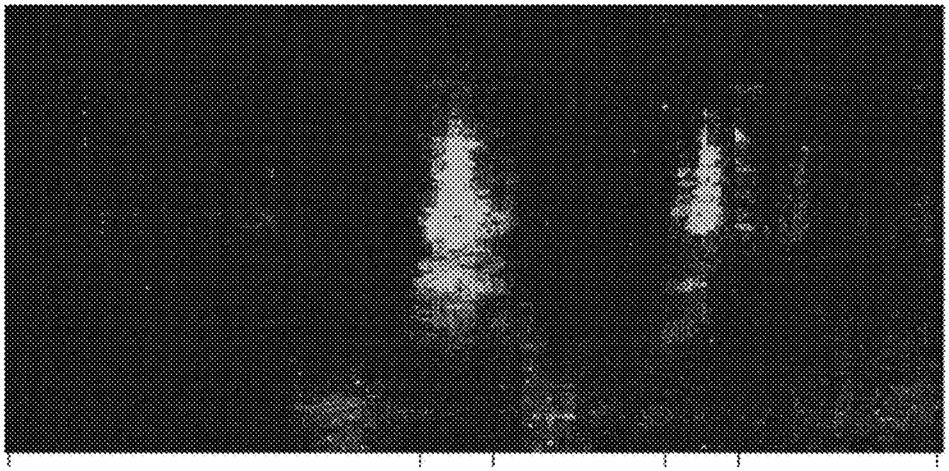
FIGS. 15A and 15B are schematic diagrams illustrating a relationship between a printed image and a thickness of a fixation belt when image dropout occurs.
Figure 15B:
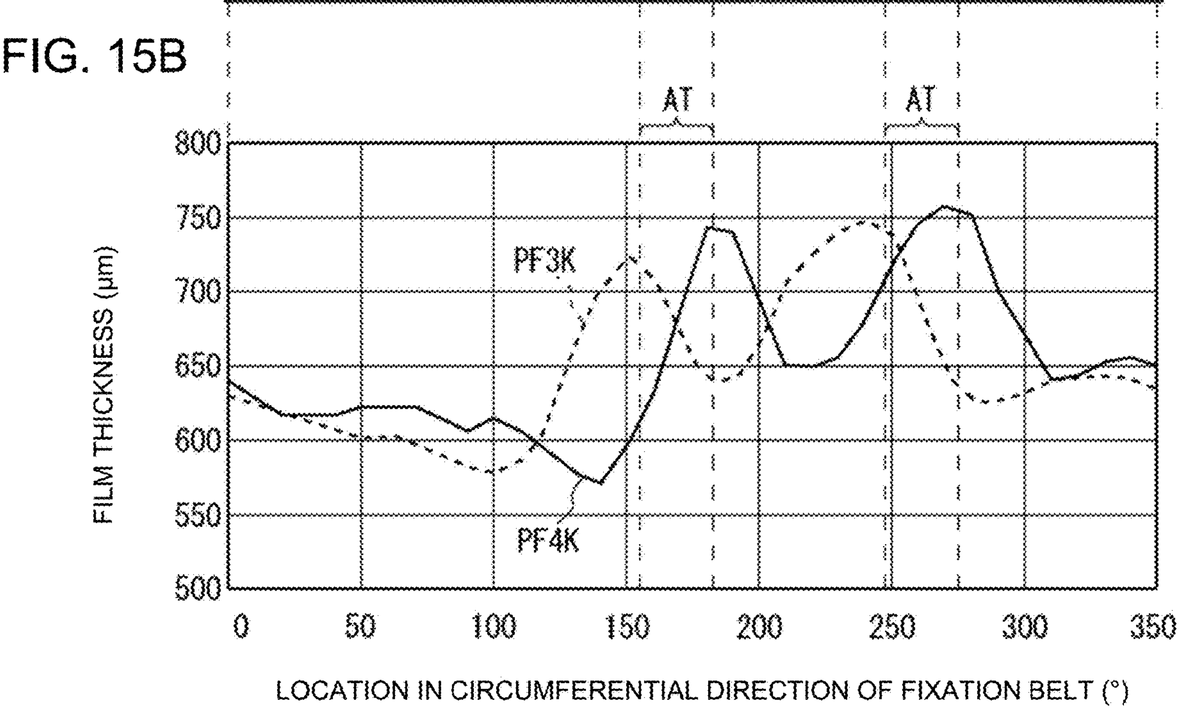
Figure 18:
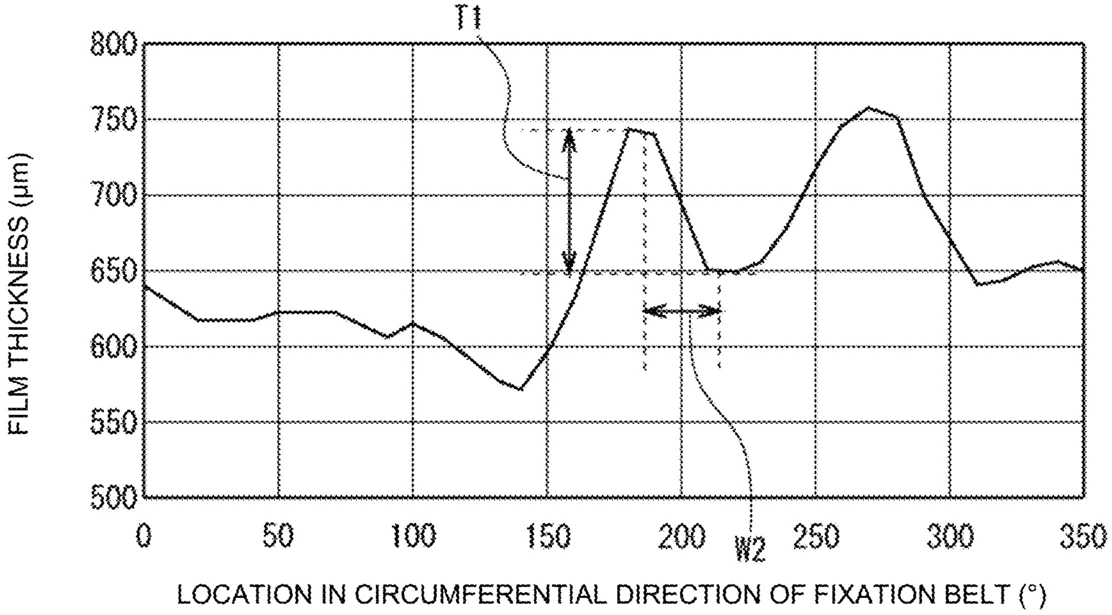
FIG. 18 is a schematic diagram illustrating a film thickness profile of the fixation belt along a circumferential direction of the fixation belt, indicating a height difference T1 between a local maximum and a local minimum in the film thickness profile and a distance W2 between a local maximum point and a local minimum point in the circumferential direction of the fixation belt.

In FIG. 15B, the film thickness varies to some extent, depending on the location in the circumferential direction, in both of the film thickness distribution curves PF3K and PF4K. Also, the absolute value of the film thickness at each location in the circumferential direction, and the locations in the circumferential direction at which a change occurs (hereinafter also referred to as phases), are different between the film thickness distribution curves PF3K and PF4K to some extent. In other words, the degree of waveform similarity between the film thickness distribution curves PF3K and PF4K is relatively low. In addition, a positional deviation (i.e., a phase difference) occurs in the circumferential direction.

Furthermore, in the film thickness distribution curves PF3K and PF4K, a peak shape repeatedly appears at relatively short intervals of approximately 90° due to changes in film thickness. Comparison of FIG. 15B with FIG. 15A indicates that image dropout occurs in a range interposed between a peak of the thickness distribution curve PF3K and a peak of the film thickness distribution curve PF4K in the circumferential direction. More specifically, in FIG. 15B, image dropout occurs in a region in the circumferential direction where the film thickness changes from increase to decrease in the film thickness distribution curve PF3K whose phase leading that of the thickness distribution curve PF4K, and the film thickness increases in the film thickness distribution curve PF4K whose phase following that of the film thickness distribution curve PF3K. Such a range is hereinafter referred to as a film thickness increase/decrease range AT.

Next, the distribution of pressure in the nip region N is investigated when the fixation belts 277J and 277K are each used in the fixation unit 250. The result demonstrates that in the fixation unit 250, a wider portion that has a lower pressure than in the surrounding is formed when the fixation belt 277K is used, compared to when the fixation belt 277J is used. The formation of such a portion of the nip region N that has a lower pressure is hereinafter also referred to as pressure dropout.

Thus, in the image formation apparatus 201, in the case in which the film thickness sharply changes from a relatively great thickness to a relatively small thickness in a relatively narrow angle range such as the film thickness increase/decrease range AT in the circumferential direction of the fixation belt 277, image dropout is likely to occur in a printed image (FIG. 15A). Also, in the image formation apparatus 201, when a phase deviation in film thickness profile between points of the fixation belt 277 relatively close to each other in the width direction occurs, local pressure dropout is likely to occur, so that image dropout is likely to occur in a printed image.

Here, a relationship is investigated between the length and magnitude of pressure of each portion in the nip region N of the fixation unit 250, and the film thickness profile of the fixation belt 277K at which image dropout occurs. FIGS. 17A and 17B illustrate characteristics of a pressure distribution in the nip region N (FIG. 5), and the film thickness distribution curve PF4K of the fixation belt 277K (FIG. 15B), which are vertically arranged.

Here, in the characteristics of a pressure distribution in the nip region N, a distance corresponding to a low load region AR1 produced by the pressurization pad 71 and the like is represented by W1 (μm). A length, in the circumferential direction of the fixation belt, from a local maximum (extrema) to a local minimum (extrema) of the film thickness distribution curve PF4K is represented by W2 (°), and a height difference (a difference in the film thickness) from the local maximum to the local minimum is represented by T1.

In the image formation apparatus 201, image dropout occurs in the circumferential direction of the fixation belt 277 in the case in which the distance W2 of the film thickness distribution curve PF4K is smaller than the distance W1 of the low load region AR1, and the height difference T1 is less than 101 μm.

Therefore, in the image formation apparatus 201, conditions for preventing the occurrence of image dropout in the circumferential direction of the fixation belt 277 may be represented by expressions (1) and (2), where a constant r represents the radius of the fixation belt 277, which is 21 to 24 mm.

$$T1 < 101\ (\mu\text{m}) \tag{1}$$

$$W2 \leq 360 \times \frac{W1}{2\pi r}\ (\mu\text{m}) \tag{2}$$

Next, the case in which image dropout occurs in the width direction of the fixation belt 277 in the image formation apparatus 201 is discussed. Here, it is assumed that as in the fixation belt 277K (FIG. 15B), a phase difference occurs between the film thickness distribution curves PF3K and PF4K (i.e., film thickness profiles) at the measurement locations PA3 and PA4. The measurement locations PA3 and PA4 are hereinafter also referred to as a first location and a second location, respectively.

Figure 19:
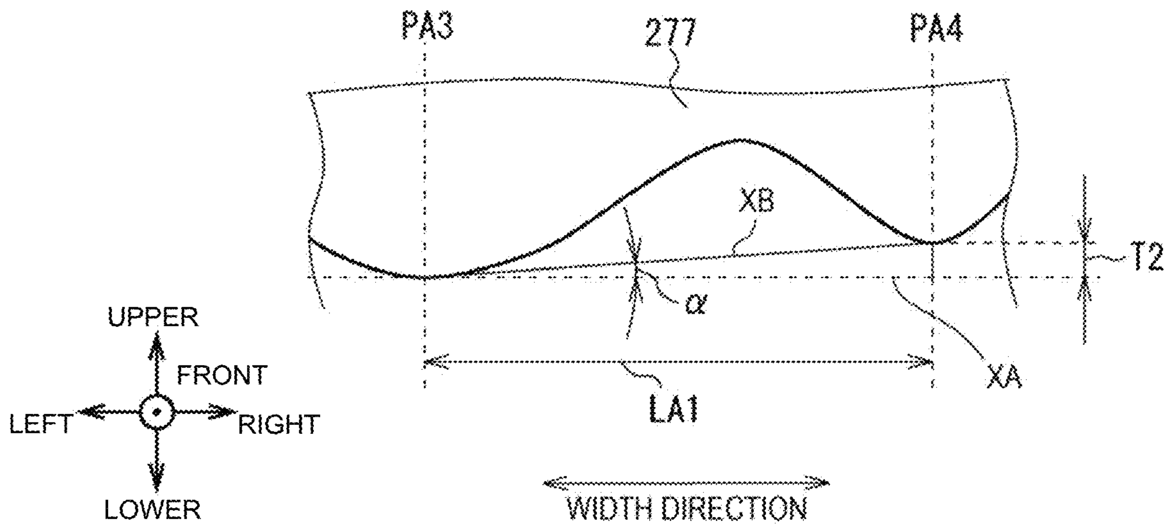
FIG. 19 is a schematic diagram illustrating a relationship between an interval between adjacent measurement locations in the widthwise direction of the fixation belt and a film thickness difference between the adjacent measurement locations in the widthwise direction.

FIG. 19 is a schematic diagram illustrating the fixation belt 277 as viewed from the front thereof. In FIG. 19, a straight line XA is a virtual straight line extending along the left-right direction (i.e., the width direction). A straight line XB is a virtual straight line connecting the outer peripheral surface at the measurement location PA3 and the outer peripheral surface at the measurement location PA4. An angle α represents an angle between the straight lines XA and XB.

In FIG. 19, if a film thickness difference T2 in the width direction, which is a difference between the film thickness at the measurement location PA3 and the film thickness at the measurement location PA4 different from the measurement location PA3 in the width direction, is relatively great, the fixation belt 277 cannot sufficiently follow the medium M in the nip region N, resulting in the occurrence of image dropout.

Figures 20, 21:
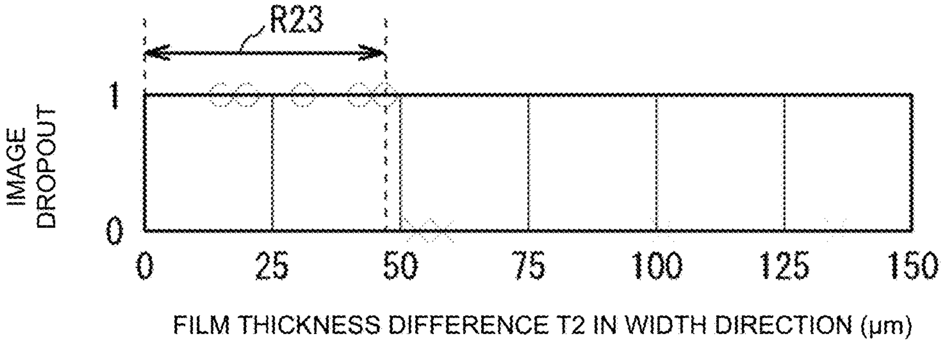
FIG. 20 is a schematic diagram illustrating a relationship between the film thickness difference and a presence or absence of image dropout.
FIG. 21 is a schematic diagram illustrating the relationship between the film thickness difference and the presence or absence of image dropout.

With the above in mind, a relationship between the magnitude of the film thickness difference T2 in the width direction and the presence or absence of image dropout is investigated. The result of the investigation is indicated in the table T3 of FIG. 20. In the table T3, the open circular symbol represents the absence of occurrence of image dropout, and the cross symbol represents the presence of occurrence of image drop. FIG. 21 is a graph illustrating the relationship between the film thickness difference T2 in the width direction and the presence or absence of image dropout. Concerning the presence or absence of image dropout, the value "0" is associated with the presence of occurrence of image dropout, and the value "1" is associated with the absence of occurrence of image dropout.

As can be seen from FIGS. 20 and 21, for the fixation belt 277, in the case in which the widthwise interval LA1 is 26 mm, then if the film thickness difference T2 in the width direction is 47 μm or less, the occurrence of image dropout can be avoided. In FIG. 19, if the widthwise interval LA1 is 26 mm and the film thickness difference T2 in the width direction is 47 μm, the angle α is 0.1°.

Therefore, in the image formation apparatus 201, conditions for the absence of occurrence of image dropout in terms of the circumferential direction of the fixation belt 277 may be represented by expressions (3) and (4) below.

$$T2 < 47\ (\mu\text{m}) \tag{3}$$

$$\tan^{-1}\left(\frac{T2}{LA1}\right) \leq 0.1 \tag{4}$$

2-2. Effect and the Like

With the above configuration, in the image formation apparatus 201 according to a second embodiment, the height difference T1, which is a difference between a local maximum and a local minimum in the film thickness distribution curve of the fixation belt 277 in which the thickness of the elastic layer 82 is 300 μm or more, satisfies at least expression (1) above. As a result, in the image formation apparatus 201, the occurrence of image dropout can be satisfactorily reduced in the circumferential direction of the fixation belt 277.

In addition, in the image formation apparatus 201, the distance W2 related to the film thickness distribution curve of the fixation belt 277 and the distance W1 corresponding to the low load region AR1 in the nip region N are set so as to satisfy expression (2) above. As a result, in the image formation apparatus 201, the occurrence of image dropout can be reliably reduced in the circumferential direction of the fixation belt 277.

Furthermore, in the image formation apparatus 201, the film thickness difference T2 of the fixation belt 277 is set so as to satisfy expression (3) above. As a result, in the image formation apparatus 201, the occurrence of image dropout can be satisfactorily reduced in the width direction of the fixation belt 277.

In addition, in the image formation apparatus 201, the film thickness difference T2 in the width direction and the widthwise interval LA1 of the fixation belt 277 are set so as to satisfy expression (4). As a result, in the image formation apparatus 201, the occurrence of image dropout can be satisfactorily reduced in the width direction of the fixation belt 277, irrespective of the widthwise interval LA1.

Thus, in the image formation apparatus 201, pressure dropout can be prevented from occurring in the nip region N due to the presence of the non-uniform film thickness of the fixation belt 277, and therefore, the occurrence of image dropout (FIG. 15A) in an image printed on the medium M can be reliably avoided.

In addition, in the image formation apparatus 201, the value of the load hardness ratio of the fixation belt 277 is 0.566 or more as in a first embodiment. As a result, in the image formation apparatus 201, toner can be sufficiently fixed to any of the even portions and dents D of the medium M as in a first embodiment, and therefore, uniform gloss without irregularity can be imparted to an image printed on the medium M.

In other regards, the image formation apparatus 201 according to a second embodiment can have effects similar to those of a first embodiment.

With the above configuration, in the image formation apparatus 201 according to a second embodiment, the height difference T1, which is a difference between a local maximum and a local minimum appearing in the film thickness distribution curve, is less than 101 μm in the fixation belt 277 in which the thickness of the elastic layer 82 is 300 μm or more. As a result, in the image formation apparatus 201, the occurrence of pressure dropout, which is the phenomenon that pressure applied to the medium M is locally decreased, in the nip region N of the fixation unit 250 can be reduced, whereby the occurrence of image dropout can be satisfactorily reduced.

3. Other Embodiments

It should be noted that in a first embodiment, the nip width WN of the fixation unit 50 is 17 mm, and the conveyance speed of the medium M is 4 ips, i.e., approximately 101.6 mm/s, so that the time it takes for a predetermined portion of the medium M to pass through the nip region N is approximately 0.2 sec. Based on this, the fixation belt 77 is assessed in terms of load hardness value and load hardness ratio as measured after 0.2 sec has just passed since the start of measurement. However, the disclosure is not limited thereto. By changing the nip width WN of the fixation unit 50 and the conveyance speed of the medium M, the passage time may be set to various times, such as 0.1 sec and 0.4 sec. In that case, the fixation belt 77 may be assessed in terms of load hardness value and load hardness ratio as measured after such a different passage time has just passed since the start of measurement. Alternatively, the fixation belt 77 may be assessed in terms of load hardness value and load hardness ratio as measured after a time shorter than the above passage time has just passed. The same is true of a second embodiment.

In a first embodiment, in the assessment test of the fixation belt 77, the toner even surface area ratio is calculated based on the luminance value of a microscopic image obtained using a laser microscope, and the gloss level is rated on a scale of 10 levels using the toner even surface area ratio. However, the disclosure is not limited thereto. For example, the gloss level may be rated by various techniques, e.g., subjectively by an assessor's visual inspection. The number of gloss levels is not limited to 10, and may be 9 or less or may be 11 or more. The same is true of a second embodiment.

In a first embodiment, the inner diameter of the fixation belt 77 is in a range of 42 to 48 mm. However, the disclosure is not limited thereto. The inner diameter of the fixation belt 77 may be less than 44 mm or more than 48 mm within the range of approximately 15 to 60 mm. The same is true of a second embodiment.

In a first embodiment, the thickness of the elastic layer 82 included in the fixation belt 77 (FIG. 4) is approximately 300 to 800 μm. However, the disclosure is not limited thereto. The thickness of the elastic layer 82 may, for example, be approximately 100 to 300 μm or approximately 800 to 1000 μm. The same is true of a second embodiment.

In a second embodiment, the height difference T1, which is a difference between a local maximum and a local minimum appearing on the film thickness distribution curve of the fixation belt 277, is less than 101 μm. However, the disclosure is not limited thereto. The upper limit value of the height T1 may be determined based on these values. In that case, it is desirable that the relationship represented by expression (2) be satisfied.

In a second embodiment, concerning the width direction of the fixation belt 277, in the case in which the widthwise interval LA1 is 26 mm, the film thickness difference T2 in the width direction, which is a difference value in film thickness between two measurement locations PA separated from each other by the widthwise interval LA1, is 47 μm or less. However, the disclosure is not limited thereto. The widthwise interval LA1 may have various other values, and based on this, the film thickness difference T2 in the width direction may have other upper limit values. In that case, it is preferable that the relationship represented by expression (4) be satisfied.

In a first embodiment, the value of the load hardness ratio of the fixation belt 77 of the upper fixation unit 51 in the fixation unit 50 is 0.566 or more. However, the disclosure is not limited thereto. For example, the value of the load hardness ratio of the pressurization belt 97 of the lower fixation unit 52 may be 0.566 or more. In that case, the fixation belt 77 and the pressurization belt 97 may or may not have the same value of the load hardness ratio. The same is true of a second embodiment.

In a first embodiment, the medium M (FIG. 6) is configured to include the base layer ML1 and the covering layers ML2 and ML3 stacked together, and the minute empty pores H1, H2, and H3 are formed in the respective layers. However, the disclosure is not limited thereto. For example, the medium M may be configured to include a single layer, two layers, or four or more layers. Minute empty pores may be formed in at least one of these layers. The medium M is not limited to a film-like medium, and may, for example, be a medium M obtained by attaching a film to a predetermined base sheet. The same is true of a second embodiment.

In a first embodiment, the medium cassette 10 is provided in the image formation apparatus 1, and the long medium M is drawn out of the medium feed roll MR1 (FIG. 1) and is fed. However, the disclosure is not limited thereto. For example, a medium M, such as cut paper of A3 size, A4 size, or the like, may be stored in a predetermined medium cassette, and the medium M may be picked up and fed from the medium cassette, one sheet at a time. The same is true of a second embodiment.

In a first embodiment, five processing units 30 are provided in the image formation apparatus 1 (FIG. 1). However, the disclosure is not limited thereto. For example, four or less processing units 30 or fix or more processing units 30 may be provided in the image formation apparatus 1. The same is true of a second embodiment.

The invention is not limited to the above embodiments or other embodiments. Specifically, the scope of the invention encompasses embodiments obtained by combining all or a portion of the above embodiments and other embodiments in any fashion, and embodiments obtained by extracting a portion thereof.

In a first embodiment, the fixation unit 50, which is a fixation device, includes the fixation belt 77 as an annular belt, and the pressurization belt 97 as a counter member. However, the disclosure is not limited thereto. A fixation device may include an annular belt having various other configurations, and a counter member.

The invention is useful in the case in which a toner image formed on a medium by, for example, electrophotography is fixed to the medium by a fixation unit.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A fixation device comprising:

an annular belt with an outer peripheral surface that is configured to move at a predetermined speed and including an elastic layer with a thickness of more than 300 μm; and a counter member that is opposite the outer peripheral surface of the annular belt and forms a nip region with the annular belt, wherein a ratio (A/B) of a first hardness value (A) to a second hardness value (B) of the annular belt is 0.566 or more, where the first hardness value (A) is a value as measured, in hardness measurement of the outer peripheral surface using a hardness meter, at a first time point when a measurement time corresponding to a passage time has just passed since a start of the hardness measurement, and the second hardness value (B) is a value as measured, in the hardness measurement, at a second time point when the measured value of the hardness meter has just been saturated, wherein the passage time is a time it takes for a certain point of the outer peripheral surface to pass through the nip region, and the ratio (A/B) of the annular belt is 0.698 or less.

2. The fixation device according to claim 1, wherein the hardness meter is configured to apply a predetermined load to a measurement terminal to push the measurement terminal into the outer peripheral surface to be measured, at a predetermined indention speed, and thereby obtain the first hardness value and the second hardness value based on a displacement amount of the measurement terminal.

3. The fixation device according to claim 1, wherein an inner diameter of the annular belt is 42 mm or more and 48 mm or less.

4. The fixation device according to claim 1, wherein the annular belt includes: a base; a surface layer provided on an outer side of the base and forms the outer peripheral surface; and the elastic layer provided between the base and the surface layer, wherein the thickness of the elastic layer is in a range of 377 to 607 μm.

5. The fixation device according to claim 1, wherein a height difference of the outer peripheral surface along a circumferential direction of the annular belt at a first location in a width direction of the annular belt, which is a difference between a local maximum to a local minimum in a film thickness profile of the annular belt along the circumferential direction of the outer peripheral surface at the first location in the width direction of the annular belt, is less than 101 μm.

6. An image formation apparatus comprising:

a development device that causes a developer image using a developer to adhere to a surface of a medium; and the fixation device according to claim 1, wherein the fixation device fixes the developer image to the medium.

7. A fixation device comprising:

an annular belt with an outer peripheral surface that is configured to move at a predetermined speed and including an elastic layer with a thickness of more than 300 μm; and a counter member that is opposite the outer peripheral surface of the annular belt and forms a nip region with the annular belt, wherein a ratio (A/B) of a first hardness value (A) to a second hardness value (B) of the annular belt is 0.566 or more, where the first hardness value (A) is a value as measured, in hardness measurement of the outer peripheral surface using a hardness meter, at a first time point when a measurement time corresponding to a passage time has just passed since a start of the hardness measurement, and the second hardness value (B) is a value as measured, in the hardness measurement, at a second time point when the measured value of the hardness meter has just been saturated, wherein the passage time is a time it takes for a certain point of the outer peripheral surface to pass through the nip region, a height difference of the outer peripheral surface along a circumferential direction of the annular belt at a first location in a width direction of the annular belt, which is a difference between a local maximum to a local minimum in a film thickness profile of the annular belt along the circumferential direction of the outer peripheral surface at the first location in the width direction of the annular belt, is less than 101 μm, the nip region includes a first load region in which a first load is applied against the counter member, and a second load region in which a second load greater than the first load of the first load region is applied against the counter member, and the annular belt is configured such that a length, in the circumferential direction of the annular belt, of a portion of the outer peripheral surface of the annular belt from the local maximum to the local minimum is shorter than a length, in the circumferential direction of the annular belt, of the first load region of the nip region.

8. A fixation device comprising:

an annular belt with an outer peripheral surface that is configured to move at a predetermined speed and including an elastic layer with a thickness of more than 300 μm; and a counter member that is opposite the outer peripheral surface of the annular belt and forms a nip region with the annular belt, wherein a ratio (A/B) of a first hardness value (A) to a second hardness value (B) of the annular belt is 0.566 or more, where the first hardness value (A) is a value as measured, in hardness measurement of the outer peripheral surface using a hardness meter, at a first time point when a measurement time corresponding to a passage time has just passed since a start of the hardness measurement, and the second hardness value (B) is a value as measured, in the hardness measurement, at a second time point when the measured value of the hardness meter has just been saturated, wherein the passage time is a time it takes for a certain point of the outer peripheral surface to pass through the nip region, a height difference of the outer peripheral surface along a circumferential direction of the annular belt at a first location in a width direction of the annular belt, which is a difference between a local maximum to a local minimum in a film thickness profile of the annular belt along the circumferential direction of the outer peripheral surface at the first location in the width direction of the annular belt, is less than 101 μm, the annular belt is configured such that an angle between a straight line connecting the outer peripheral surface at the first location in the width direction of the annular belt and the outer peripheral surface at a second location different from the first location in the width direction of the annular belt, and a straight line extending along the width direction, is 0.1° or less.

9. The fixation device according to claim 8, wherein the annular belt is configured such that a film thickness difference between the second location and the first location at a same position in the circumferential direction of the annular belt is 47 μm or less.

* * * * *